United States Patent
Sukegawa

(10) Patent No.: US 7,293,092 B2
(45) Date of Patent: Nov. 6, 2007

(54) COMPUTING SYSTEM AND CONTROL METHOD

(75) Inventor: Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 968 days.

(21) Appl. No.: 10/341,505

(22) Filed: Jan. 14, 2003

(65) Prior Publication Data

US 2004/0019624 A1 Jan. 29, 2004

(30) Foreign Application Priority Data

Jul. 23, 2002 (JP) .......................... P2002-213341

(51) Int. Cl.
 *G06F 15/173* (2006.01)
(52) U.S. Cl. ...................... 709/226; 709/238; 709/245; 718/103; 718/105
(58) Field of Classification Search ................ 718/101, 718/102, 103, 105; 709/202, 226, 238, 245
See application file for complete search history.

(56) References Cited

U.S. PATENT DOCUMENTS 5,559,710 A * 9/1996 Shahraray et al. .......... 700/100
5,978,830 A * 11/1999 Nakaya et al. .............. 718/102
6,618,820 B1 * 9/2003 Krum ......................... 718/101
2002/0023122 A1 * 2/2002 Polizzi et al. ............... 709/202

FOREIGN PATENT DOCUMENTS

| JP | 8-77029 | 9/1994 |
| JP | 8-137910 | 11/1994 |
| JP | 10-240698 | 2/1997 |

\* cited by examiner

*Primary Examiner*—Phuoc Nguyen
(74) *Attorney, Agent, or Firm*—Reed Smith LLP; Stanley P. Fisher, Esq.; Juan Carlos A. Marquez, Esq.

(57) ABSTRACT

A parallel or grid computing system that having a plurality of nodes and achieves job scheduling for the nodes with a view toward system efficiency optimization. The parallel or grid computing system has a plurality of nodes for transmitting and receiving data and a communication path for exchanging data among the nodes, which are either a transmitting node for transmitting data or a receiving node for processing a job dependent on transmitted data, and further has a time measuring means for measuring the time interval between the instant at which data is called for by a job and the instant at which the data is transmitted from a transmitting node to a receiving node, a time counting means for adding up the measured wait time data about each job, and a job scheduling means for determining the priority of jobs in accordance with the counted wait time and for scheduling jobs.

7 Claims, 19 Drawing Sheets

F I G. 5

| RECEPTION VERIFICATION FLAG 1130 | FLAG VALUE |
|---|---|
| INITIAL VALUE | "0" |
| CPU 600 STARTS ITS WAIT FOR RECEIVED DATA | "1" |
| CPU 600 FINISHES READING RECEIVED DATA | "0" |

F I G. 6

| RECEPTION COMPLETION FLAG 1100 | FLAG VALUE |
|---|---|
| INITIAL VALUE | "0" |
| DATA HAS REACHED RECEPTION BUFFER 620 | "1" |
| CPU 600 FINISHES READING RECEIVED DATA | "0" |

FIG. 8

|  | WEIGHT |
|---|---|
| PORT X | 0.5 |
| PORT Y | 1.0 |
| PORT Z | 0.2 |
| PORT U | 0.6 |

FIG. 9

570　　NODE GROUP INFORMATION TABLE

|        | JOB P | JOB Q |
|--------|-------|-------|
| PORT X | 1     | 0     |
| PORT Y | 1     | 0     |
| PORT Z | 0     | 1     |
| PORT U | 0     | 1     |

F I G. 1 6
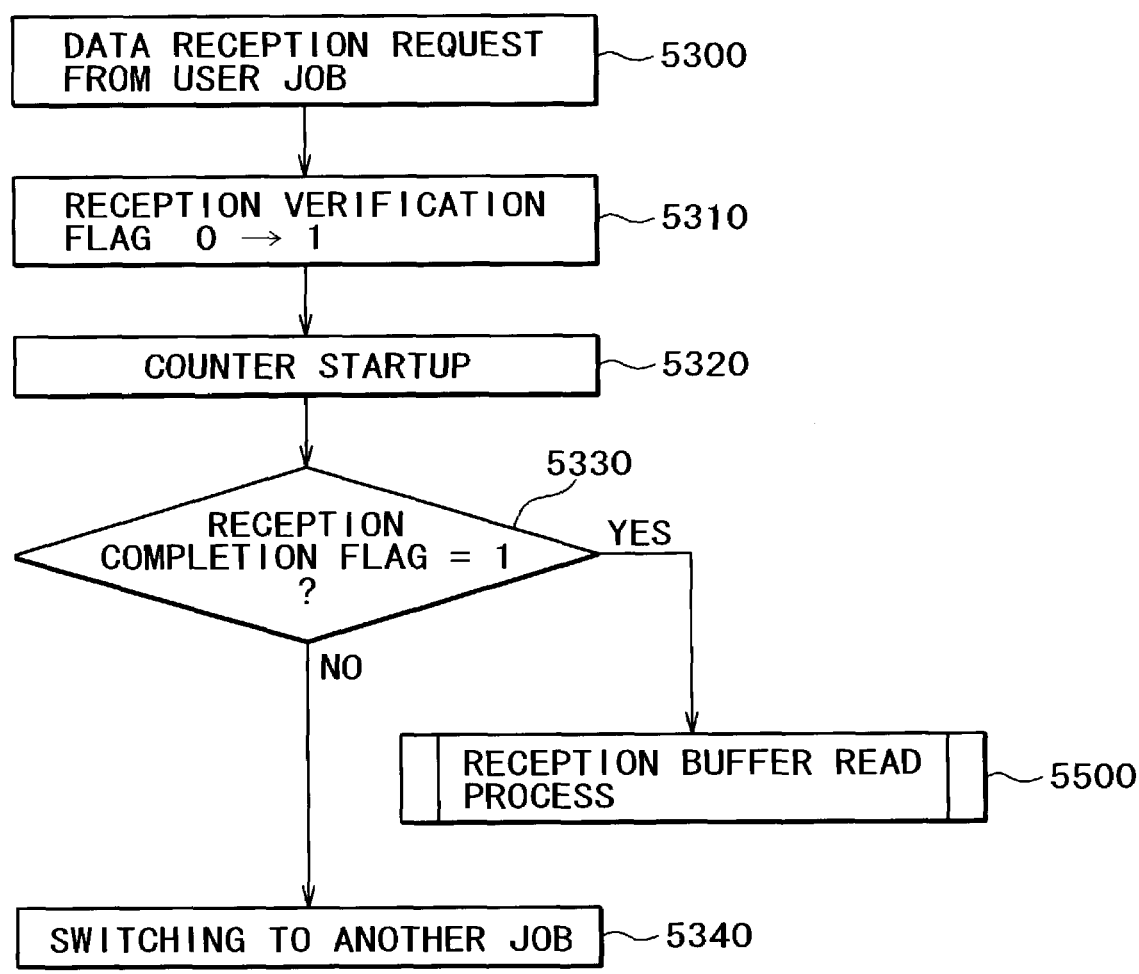

COMPUTING SYSTEM AND CONTROL METHOD

BACKGROUND OF THE INVENTION

1. Field of the Invention

The present invention relates to job scheduling for a parallel or grid computing system comprising a plurality of nodes and, more particularly, to a method for determining the priority of jobs so as to increase the overall system efficiency and a communication scheme for implementing such a priority determination method.

2. Description of the Related Art

A system in which nodes having one or more CPUs and a main memory are interconnected via a network to exchange jobs and data or operated in coordination with each other to perform calculations on a large scale is called a parallel or grid computing system. The parallel or grid computing system is an essential configuration for establishing a large-scale system where more than 1000 CPUs are used. The difference between the grid computing system and parallel computing system arises from the system's physical expanse and network performance and specifications. However, the present invention does not distinguish between these two systems.

When large-scale calculations are performed by simultaneously using a plurality of nodes in a parallel or grid computing system (these calculations are hereinafter referred to as "multi-node calculations") it is important that the nodes be effectively mapped. For mapping, it is fundamental that the nodes are preoccupied by a single job. Here, the term "job" refers to a part of a multi-node calculation, which is divided into a number of assignments for various nodes. All the nodes are preoccupied by a single job because a high processing performance is needed. If a single node performs multiple jobs at a time, that is, if the same node is involved in two or more multi-node calculations, the system lowers its calculation efficiency and provides no advantages.

However, if the data originally stored by the nodes differ in nature and the data owned by a specific node is required for two or more multi-node calculations, the system may increase its overall efficiency when the node having such required data is involved in two or more multi-node calculations. If, for instance, only a certain node (hereinafter referred to as "node A") has raw data (hereinafter referred to as "data L") required for calculations in its main memory or on its disk and two multi-node calculations are to be simultaneously performed while repeatedly referring to data L, the following two execution methods may work.

Execution method 1: Data L owned by node A is copied to another node so that two nodes have data L. Each multi-node calculation is performed by one of these two nodes.

Execution method 2: Node A having data L is used for both of the two multi-node calculations. In this instance, node A executes two jobs while switching between them.

In a common calculation process, the raw data is huge but the data used for calculations is only a part of the raw data. At the beginning of the calculation process, however, the system does not know what part of the raw data should be used. In most cases, the data to be used is decided during the calculation process. When execution method 1 is used, therefore, the system copies data L entirely because it does not know what part of data L should be used. In this case, an extra amount of data is copied. In reality, execution method 2 is used in most cases, that is, node A is used for both of the two multi-node calculations.

When node A is engaged in two multi-node calculations in this manner, the system's overall efficiency depends on how node A executes two jobs. That is, the important factor for overall system efficiency increase is how the two jobs are scheduled for execution at node A (e.g., node A can alternately execute the two jobs at 1-second intervals for equal execution of the two jobs or execute one job for 0.5 second, then the other job for 1 second, and repeat this execution cycle to give high priority to the latter job). To perform scheduling so as to increase the overall system efficiency is referred to as "job scheduling optimization".

A means for job scheduling optimization at the beginning of a calculation process is disclosed in JP-A No. 137910/1996. More specifically, the invention described therein provides job scheduling optimization by calculating the scheduled termination time of each node at the beginning of a calculation process, causing the slowest node, that is, the node determining the multi-node calculation speed, to execute a multi-node calculation job with highest priority given to it, and permitting the other nodes to execute the other jobs without exceeding the scheduled termination time limit.

The invention described in JP-A No. 137910/1996 is effective for a process whose scheduled termination time can be determined at the beginning of job execution. However, it cannot effectively be used for a convergence calculation process (which is repeatedly performed until the calculation results converge) or other process whose final processing volume will be determined according to intermediate calculation results.

Further, a processing method for exercising centralized control over calculations at individual nodes is disclosed in JP-A No. 137910/1996. However, this method is not suitable for scalable job scheduling optimization applicable to large-scale multi-node calculations involving hundreds of nodes because it may incur table access conflicts. It is necessary that each node autonomously provide job scheduling optimization.

SUMMARY OF THE INVENTION

According to at least one preferred embodiment, the present invention is directed to a parallel or grid computing system comprising a plurality of nodes for transmitting and receiving data and a communication path for exchanging data among the nodes, the nodes being either a transmitting node for transmitting data or a receiving node for processing a job dependent on transmitted data, the system comprising: a time measuring means for measuring the time interval between the instant at which data is called for by the job and the instant at which the data is transmitted from the transmitting node to the receiving node; a time counting means for adding up the measured time data on an individual job basis; and a job scheduling means for determining the priority of jobs in accordance with the counted time and scheduling jobs.

The present invention thus constituted can achieve:

scheduling optimization by providing dynamic job scheduling even when multi-node calculations are to be conducted while the scheduled termination time is unknown; eliminating the necessity for centralized control over the system's job executions because each transmitting node autonomously performs job scheduling; and realizing job scheduling optimization in a scalable manner with regard to the number of nodes with no process conflicts because of the absence of the centralized control.

Other and further objects, features and advantages of the invention will appear more fully from the following description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 5 is a table illustrating the status of a reception verification flag 1130 of the first preferred embodiment;

FIG. 6 is a table illustrating the status of a reception completion flag 1100 of the first preferred embodiment;

FIG. 8 is a table showing an example of a weight table 560 of the first preferred embodiment;

FIG. 9 is a table showing an example of a node group information table of the first preferred embodiment;

FIG. 16 is a flowchart illustrating a process that is performed when a user job at a receiving node becomes ready for data reception and issues a data reception request to a transmitting node;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description of the present invention and the preferred embodiment(s) thereof is set forth in detail below with reference to the attached drawings.

Figure 1:
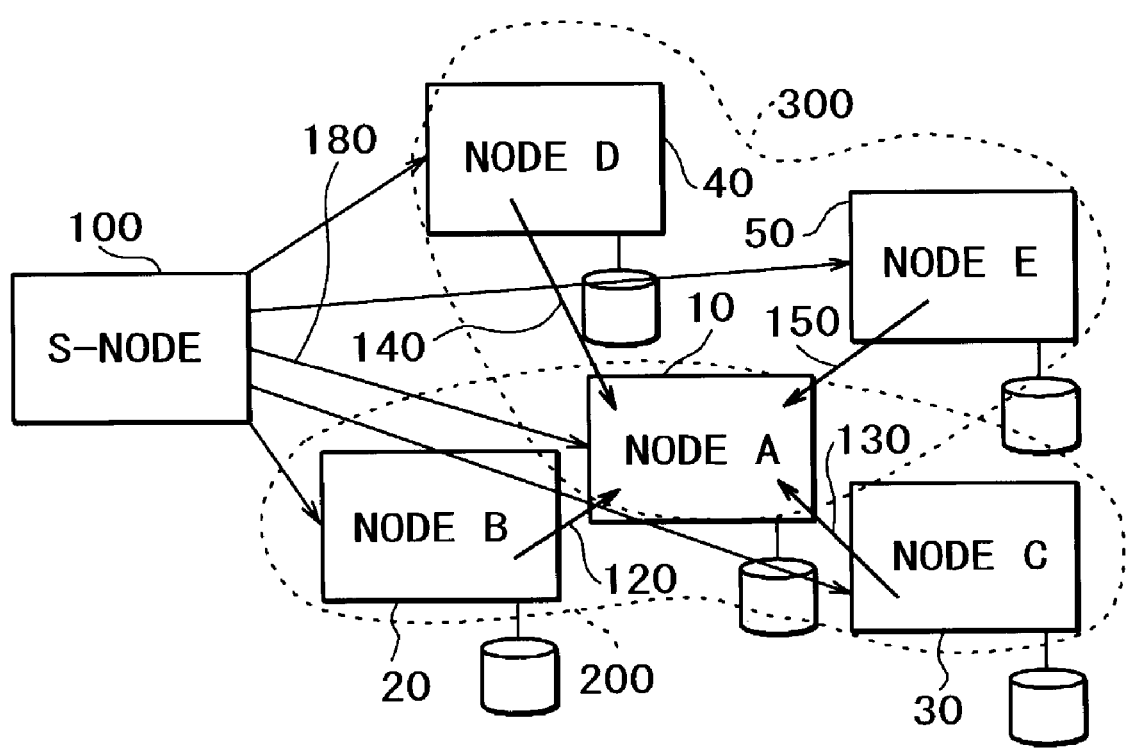
FIG. 1 is a conceptual diagram illustrating a computing system of a first preferred embodiment.

FIG. 1 is a conceptual diagram of a computing system of the first preferred embodiment of the present invention.

Calculations are performed by node A 10, node B 20, node C 30, node D 40, and node E 50 (five nodes in total).

These nodes perform two multi-node calculations (multi-node calculation 200 and multi-node calculation 300). Node A executes a job of multi-node calculation 200 (hereinafter referred to as "job P") and a job of multi-node calculation 300 (hereinafter referred to as "job Q"). Nodes B and C execute job P only. Nodes D and E execute job Q only.

In each multi-node calculation, an inter-node data communication process is repeatedly performed. That is, node A 10 repeatedly transmits data to node B 20, node C 30, node D 40, and node E 50. Node B 20, node C 30, and node D 40, and node E 50 use the data transmitted from node A 10 during a calculation. Therefore, if a job P execution at node A 10 is delayed, node B 20 and node C 30 have to wait for a data transmission from node A 10 for an increased period of time. If a job Q execution at node A 10 is delayed, node D 40 and node E 50 have to wait for a data transmission from node A 10 for an increased period of time. The overall system efficiency depends on how jobs P and Q are scheduled at node A 10.

Job scheduling optimization can be achieved in several ways. If, for instance, the execution of job P at node A 10 is given substantial priority (e.g., if node A executes job P for 10 seconds, then executes job Q for 1 second, and repeats this execution cycle), the overall system efficiency generally lowers because node D 40 and node E 50 have to wait for an increased period of time. In cases where job P requires a remarkably larger amount of time than job Q, and node B 20 and node C 30 have to wait for a long period of time and node D 40 and node E 50 do not have to wait although job P is given substantial priority, the overall system efficiency increases with an increase in job P's priority.

In a computing system of the first preferred embodiment of the present invention, the data on the period of time for which receiving nodes B 20, C 30, D 40, and E 50 waited is actually returned to transmitting node A 10 (processing steps 120 to 150 shown in FIG. 1), and then transmitting node A 10 adds up the returned wait time data on an individual job basis to determine job scheduling.

In the first preferred embodiment of the present invention, an S-node 100, which serves as an information supervisor, maintains the information about the transmission/reception relationship among the nodes and the relationship between the communication ports of nodes and the jobs, and distributes the information to each node. Further, if the processes performed at the various nodes differ in nature, the S-node 100 also distributes information that is weighted in accordance with the process differences among the nodes. In situations where node B 20 is faster than the other nodes and a 1-second wait of node B 20 is more detrimental to overall system efficiency than a 1-second wait of the other nodes, the wait time data is added up with node B 20 weighted more than the other nodes (the detailed weighting method is described below). The weight information about the nodes needs to be distributed to the nodes once at system establishment and once at the beginning of a multi-node calculation process. Therefore, the volume of processing to be performed by the S-node 100 is small. As such being the case, an alternative configuration may be formed so that one of the calculating nodes doubles as the S-node instead of using an independent S-node 100 as shown in FIG. 1.

The data transmission/reception procedure to be performed in a computing system of the first preferred embodiment of the present invention is described below, followed by the description of a preferred job scheduling method.

First, the data transmission/reception procedure is described.

Figure 2:
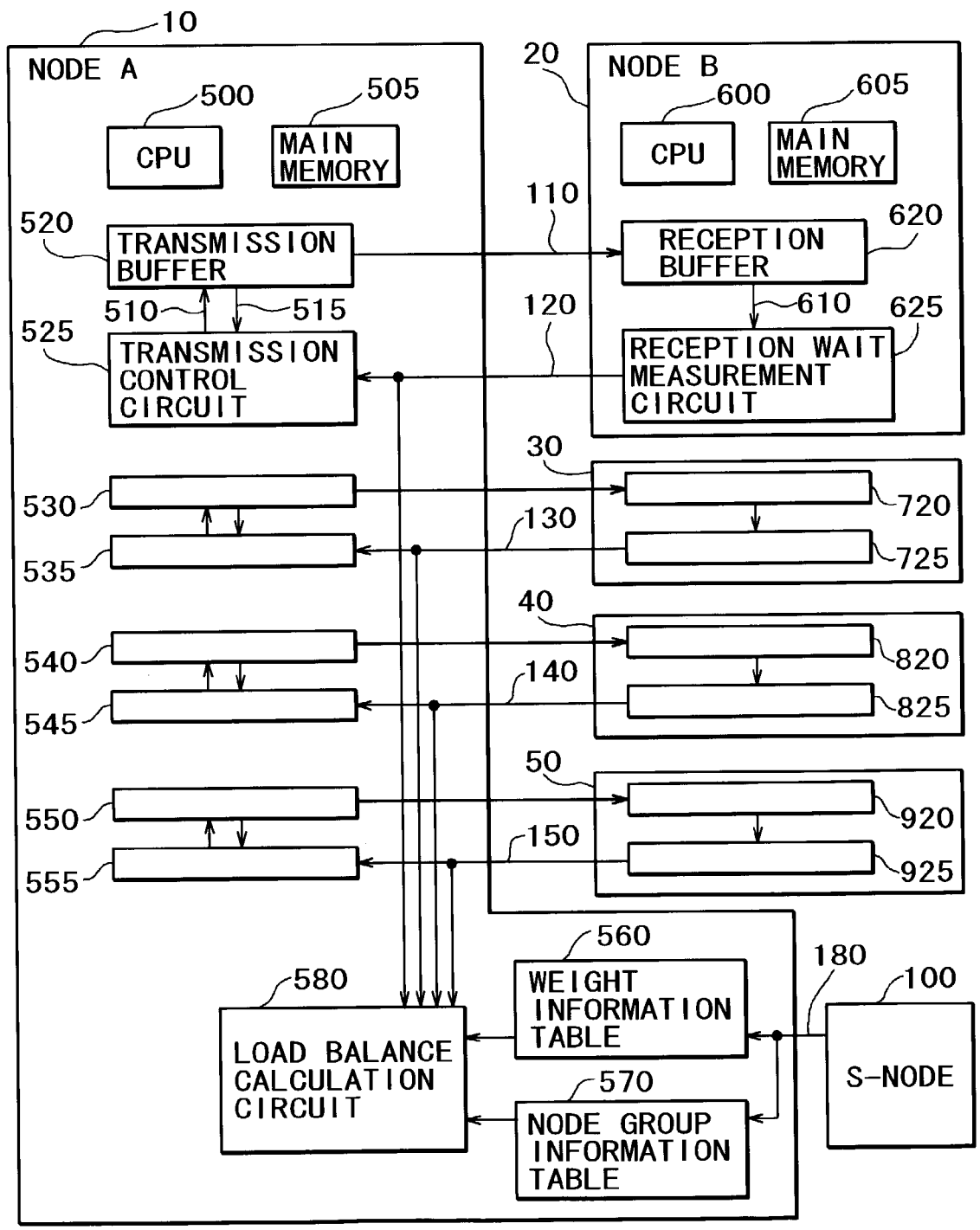
FIG. 2 is a block diagram illustrating the configuration of a computing system of the first preferred embodiment.

FIG. 2 is a block diagram illustrating the configuration of a computing system of the first preferred embodiment.

Node A 10 transmits data. Nodes B 20, C 30, D 40, and E 50 receive data. For node A 10, only the resources for the transmitting end are indicated (transmission buffer 520, transmission control circuit 525, weight information table 560, node group information table 570, and load balance calculation circuit 580). For nodes B 20, C 30, D 40, and E 50, only the resources for the receiving end are indicated (reception buffers 620, 720, 820, and 920 and reception wait measurement circuits 625, 725, 825, and 925). Although the nodes are separated into the transmitting and receiving groups in the first preferred embodiment, an alternative configuration may be formed so that all the nodes exercise both the transmission function and reception function. If all the nodes transmit and receive data, they need to have both the transmitting end resources and receiving end resources. However, they are omitted because they are not needed for the explanation of the first preferred embodiment.

Node A 10 has four transmission ports and can transmit data to four nodes. More specifically, node A has four transmission buffers 520, 530, 540 and 550. Note that the number of these ports needs to be increased if a multi-node calculation is divided into a large number of segments and node A 10 must transmit data to an increased number of jobs.

In the first preferred embodiment, the ports are connected to separate nodes as their communication destinations. However, one port is not furnished for each node at all times. The communication destinations of the ports are determined according to the number of jobs at the destinations. If, for instance, two jobs are being executed at node B 20 and node A 10 transmits data to each job, two ports are used for node B 20. Even if the number of ports is increased, the essence of the present invention remains unchanged and its embodiment can easily be determined by analogy. Therefore, the 4-port configuration is used here for explanation purposes.

Next, the data transmission from node A 10 to node B 20 is described.

For data transmission, transmission buffer 520 and reception buffer 620 are used. In this case, however, it is necessary to avoid the attempt to write transmission data in transmission buffer 520 when it is full, avoid the transmission buffer 520's attempt to write data in reception buffer 620 when it is full, and the attempt to read reception buffer 620 when no transmission data is written in it. To avoid these attempts during data transmission, CPU 500, CPU 600, transmission control circuit 525, and reception wait measurement circuit 625 are controlled with various flags.

The data transmission procedure is described below with reference to FIG. 3.

Figure 3:
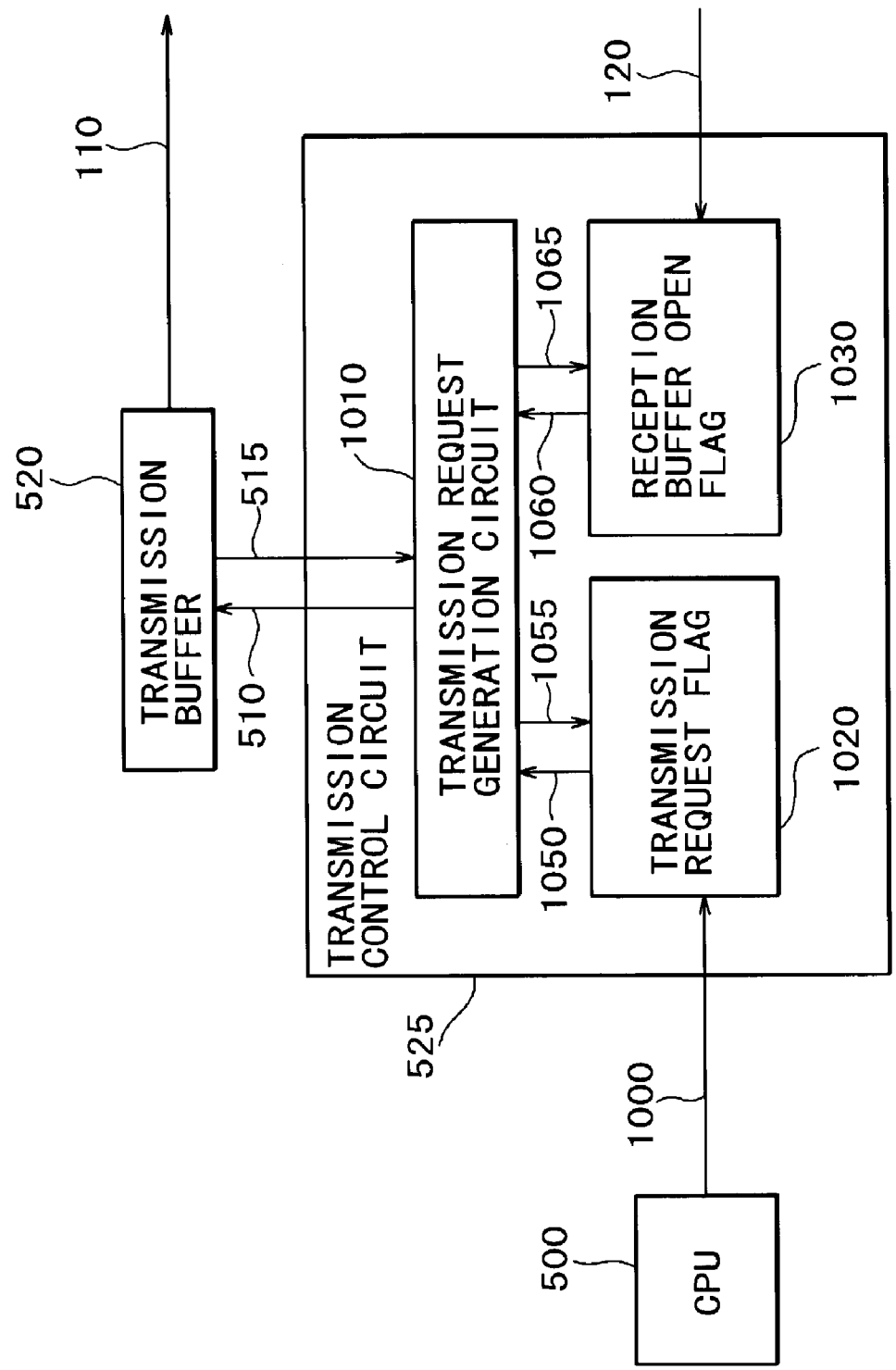
FIG. 3 is a block diagram illustrating the detailed structure of a transmission control circuit 525 of the first preferred embodiment.

FIG. 3 illustrates the detailed structure of the transmission control circuit 525 of node A 10, which is shown in FIG. 2.

The transmission control circuit 525 comprises a transmission request generation circuit 1010, a transmission request flag 1020, and a reception buffer open flag 1030.

CPU 500 checks the transmission request flag 1020 via signal line 1000. The transmission request flag 1020 indicates whether a data transmission request is generated. When the transmission request flag 1020 is "0" (that is, when no transmission request is issued or a transmission is terminated), CPU 500 copies the transmission data from the main memory 505 (FIG. 2) to transmission buffer 520. When the transmission flag 1020 is "1" (that is, a transmission is in progress), on the other hand, CPU 500 waits until the transmission flag 1020 changes to "0" and then copies the transmission data to transmission buffer 520. Although the transmission request generation circuit 1010 changes the transmission request flag from "1" to "0", its further operation is described below.

When the transmission request flag 1020 is "0", CPU 500 copies the transmission data to transmission buffer 520 and then sets the transmission request flag 1020 to "1" via signal line 1000. The transmission request generation circuit 1010 is notified via signal line 1050 that the transmission request flag is set to "1".

Upon receipt of such a notification, the transmission request generation circuit 1010 checks the value of the reception buffer open flag 1030, which is to be reported via signal line 1060. The reception buffer open flag 1030 indicates whether the reception buffer at the receiving end is available. The initial value of the reception buffer open flag 1030 is "1", which means that the reception buffer is available. If the reception buffer is not available, the value of the flag is "0". If the value of the reception buffer open flag 1030 is "1" when it is checked by the transmission request generation circuit 1010, the reception buffer is open. Therefore, a data transmission request is issued to transmission buffer 520 via signal line 510, and the reception buffer open flag 1030 is set to "0".

If the value of the reception buffer open flag 1030 is "1" when it is checked by the transmission request generation circuit 1010, the reception buffer is not available. In this instance, a data transmission does not take place until the reception buffer open flag 1030 is set to "1". More specifically, the reception buffer open flag 1030 does not change from "0" to "1" until receiving node B 20 notifies via signal line 120 that the buffer is open. This notification is further described below.

Upon receipt of a data transmission request via signal line 510, transmission buffer 520 transmits data to reception buffer 620 of receiving node B 20 via signal line 110. When the data transmission ends, the transmission request generation circuit 1010 is notified via signal line 515 that the data transmission is terminated. Upon receipt of such a notification, the transmission request generation circuit 1010 changes the transmission request flag 1020 from "1" to "0" via signal line 1055. The resulting value change of the transmission request flag 1020 indicates to CPU 500 via signal line 1000 that the data transmission is completed.

Figure 4:
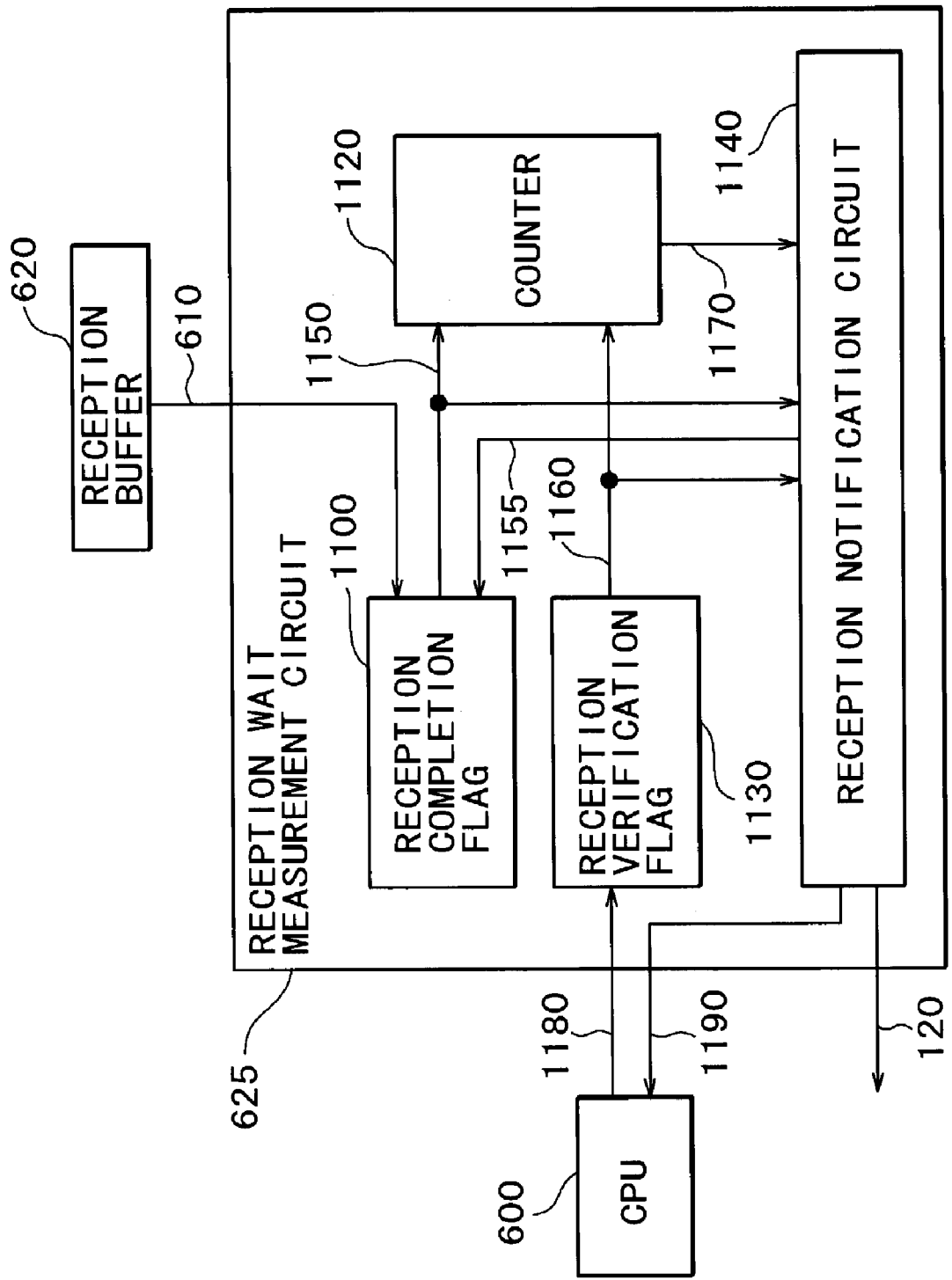
FIG. 4 is a block diagram illustrating the detailed structure of a reception wait measurement circuit 625 of the first preferred embodiment.

FIG. 4 illustrates the detailed structure of the reception wait measurement circuit 625 of node B 20, which is shown in FIG. 2. The reception wait measurement circuit 625 comprises a reception completion flag 1100, a counter 1120, a reception verification flag 1130, and a reception notification circuit 1140.

When data is written in reception buffer 620, reception buffer 620 changes the reception completion flag 1100 from "0" to "1" via signal line 610. The initial value of the reception completion flag 1100 is "0". The value of this flag remains at "1" during the interval between the instant at which data arrives and the instant at which the data is read by CPU 600. The operation performed for changing the reception completion flag from "1" to "0" is described below.

The reception notification circuit 1140 is notified via signal line 1150 that the reception completion flag 1100 is set to "1". Upon reception of such a notification, the reception notification circuit 1140 checks the value of the reception verification flag 1130 via signal line 1160. When the value of the reception verification flag 1130 is "0", the reception notification circuit 1140 does nothing. When the value of the reception verification flag 1130 is "1", the reception notification circuit 1140 notifies CPU 600 via signal line 1190 that an interrupt is generated (received data arrival notification). The initial value of the reception verification flag 1130 is "0". When CPU 600 of receiving node B 20 begins to wait for inbound data to arrive at reception buffer 620, CPU 600 sets the reception verification buffer flag 1130 to "1" via signal line 1180.

The time at which CPU 600 sets the reception verification flag 1130 to "1" can be determined properly depending on the application software. More specifically, CPU 600 can set the reception verification flag 1130 to "1" either when CPU 600 can start a process dealing with received data although it has another process to perform, or when CPU 600 has completed processes other than those dealing with received data and simply waits for the arrival of received data. In the first preferred embodiment, the setting of the reception verification flag 1130 is also used by the counter 1120 for counting the wait time as described below; therefore, CPU 600 sets the reception verification flag 1130 to "1" when CPU 600 has completed processes other than those dealing with received data and simply waits for the arrival of received data.

Upon receipt of the notification of the interrupt via signal line 1190, CPU 600 copies data from reception buffer 620 to the main memory 605 (FIG. 2). When the copy operation is completed, CPU 600 changes the reception verification flag 1130 from "1" to "0" via signal line 1180.

When notified via signal line 1160 that the reception verification flag 1130 is changed from "1" to "0", the reception notification circuit 1140 changes the reception completion flag 1100 from "1" to "0". At the same time, the reception notification circuit 1140 notifies the transmission control circuit 525 of node A 10 via signal line 120 that reception buffer 620 is rendered available with the reception completed. When such a notification is issued, the reception buffer open flag 1030 (FIG. 3) changes from "1" to "0", indicating that new data can be transmitted.

The above series of operations is performed to transmit data from node A 10 to node B 20. At the end of the operations, all the flags revert to their respective initial values.

As shown in FIG. 2, the first preferred embodiment furnishes separate signal lines 110, 120, 130, 140 and 150 to establish bidirectional communication between node A 10 and nodes B 20, C 30, D 40, and E 50, respectively. However, the essential operations provided by the first preferred embodiment remain unchanged even when only one physical signal line provides data transmission of node A 10 through the use of a LAN cable or when only one physical signal line provides the transmission/reception of control signals and data.

The job scheduling method of the first preferred embodiment, which makes use of the data transmission/reception wait time, is described below.

First, the operations of a wait time measurement counter and a wait time measurement control flag are described below.

The operation of the reception wait measurement circuit 625 within receiving node B 20 has been described. FIGS. 5 and 6 respectively show the reception verification flag 1130 and reception completion flag 1100, which are both related to the operation of the reception wait measurement circuit 625.

In FIG. 5, the initial value of the reception verification flag 1130 is "0". This flag is set to "1" when CPU 600 begins to wait for received data and set to "0" when CPU 600 finishes reading received data.

In FIG. 6, the initial value of the reception completion flag 1100 is "0". This flag is set to "1" when data arrives at reception buffer 620 and set to "0" when CPU 600 finishes reading received data.

In FIGS. 5 and 6, receiving node B 20 has halted its process to wait for the arrival of data when the reception verification flag 1130 is "1" with the reception completion flag 1100 set to "0".

The counter 1120 (FIG. 4) starts a counting operation when it detects via signal lines 1150 and 1160 that the reception verification flag 1130 is "1" with the reception completion flag 1100 set to "0" (that is, receiving node B 20 is waiting for data and received data has not arrived at a buffer). The counter 1120 stops its counting operation when the reception completion flag 1100 is set to "1". When the reception verification flag 1130 changes from "1" to "0", the counter 1120 resets its count. Received data may arrive at reception buffer 620 before CPU 600 begins to wait for data reception; in other words, the reception completion flag may be set to "1" before the reception verification flag is set to "1". In such an instance, however, the counter 1120 does not start counting because the counter operation condition, which states that the reception verification flag 1130 must be "1" with the reception completion flag 1100 set to "0", is not established.

The wait time data measured by counter 1120 is conveyed to the reception notification circuit 1140 via signal line 1170. When reporting the availability of reception buffer 620 as described above, the reception notification circuit 1140 informs node A 10 of this wait time data via signal line 120.

Next, the operation of the load balance calculation circuit 580 (FIG. 2), which determines the total accumulated wait time on an individual job basis, is described.

Figure 7:
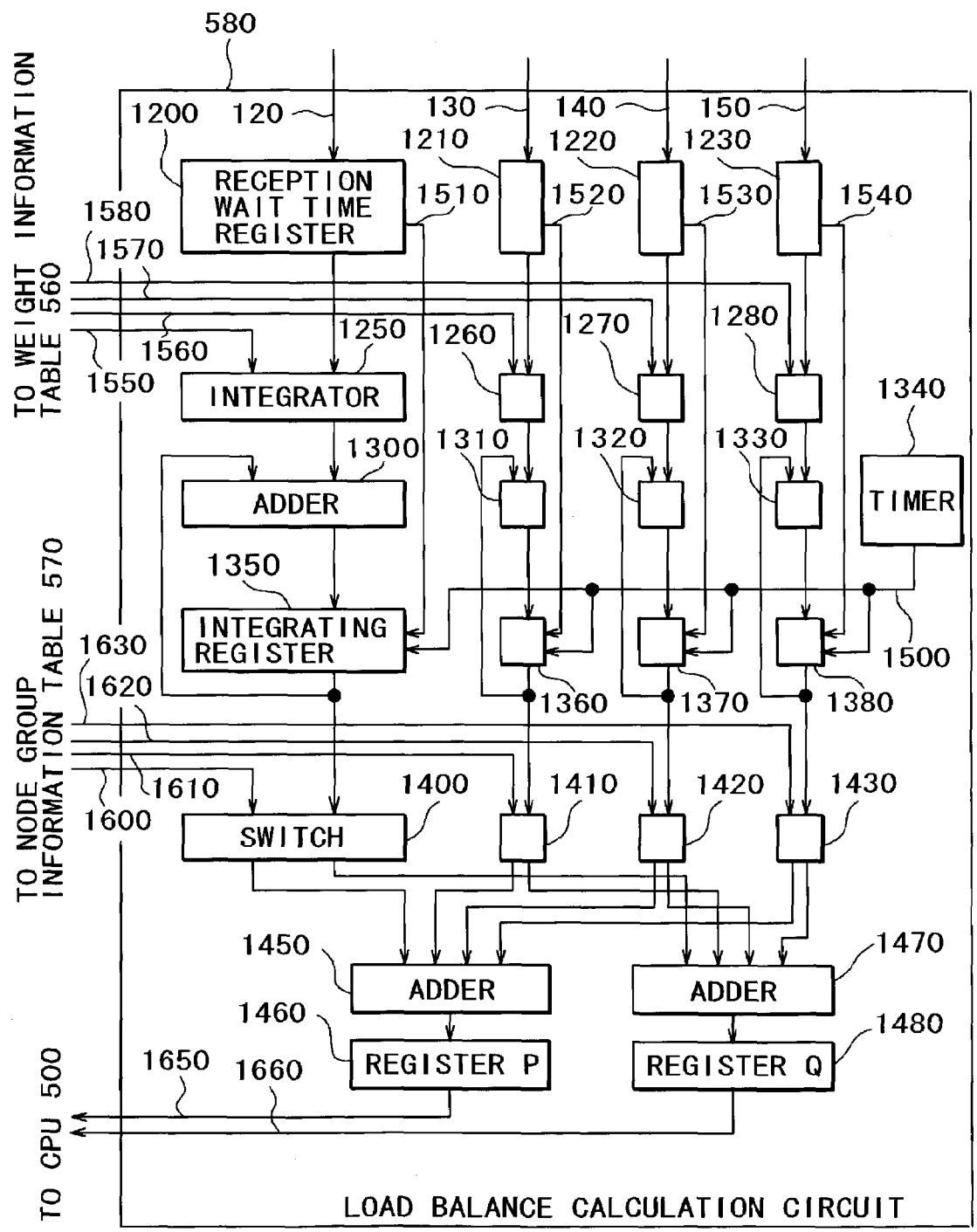
FIG. 7 is a block diagram illustrating the detailed structure of a load balance calculation circuit 580 of the first preferred embodiment.

FIG. 7 is a block diagram illustrating the detailed structure of the load balance calculation circuit 580 of node A 10.

The load balance calculation circuit 580 comprises reception wait time registers 1200, 1210, 1220 and 1230, integrators 1250, 1260, 1270 and 1280, adders 1300, 1310, 1320 and 1330, integrating registers 1350, 1360, 1370 and 1380, switches 1400, 1410, 1420 and 1430, adders 1450 and 1470, register P 1460, register Q 1480, and timer 1340.

The wait time data reported to node A 10 is written in reception wait time register 1200 via signal line 120.

Reception wait time register 1200 notifies integrator 1250 of the written wait time and requests integrating register 1350 via signal line 1510 to perform a wait time addition. Integrator 1250 calculates the product of the wait time data conveyed from reception wait time register 1200 and the associated port weight recorded in the weight table 560 (FIG. 2).

Figure 8:
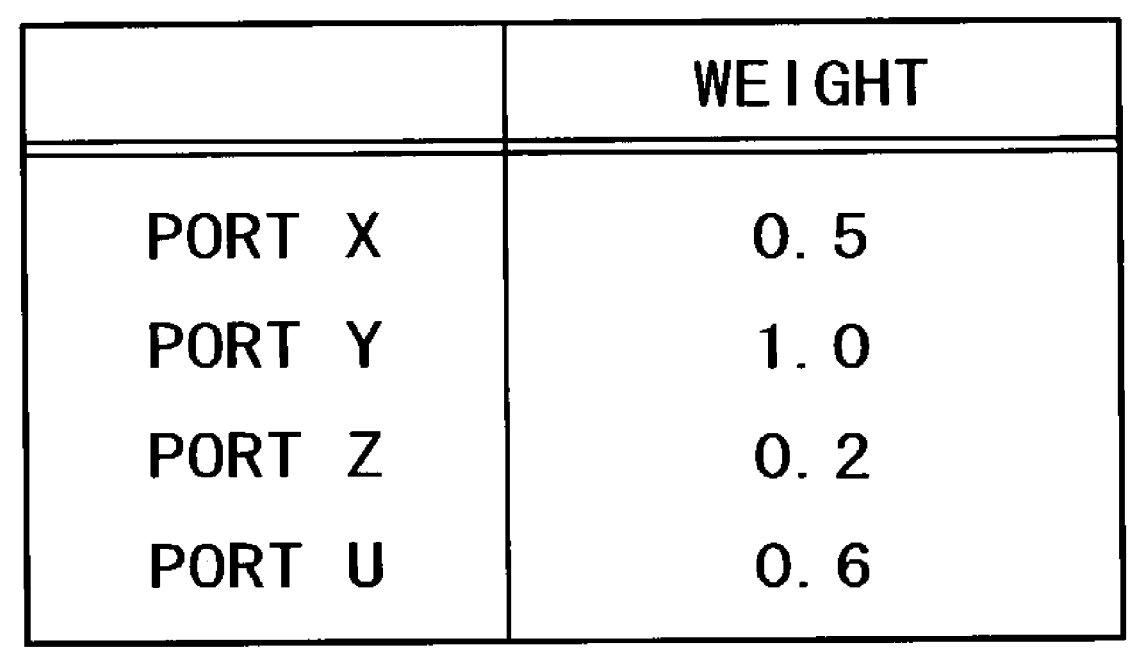

FIG. 8 shows an example of the weight table 560. Ports X, Y, Z, and U are port IDs that represent transmission buffers 520, 530, 540, and 550, respectively. Integrator 1250 deals with transmission buffer 520 and calculates the weight for port X. Therefore, the value "0.5", which is for port X, is conveyed to integrator 1250 via signal line 1550. Integrator 1250 calculates the product of the value of reception wait time register 1200 and the value "0.5" and reports it to adder 1300. The values in the weight table 560 and the values in the group information table 570 (FIG. 2), described below, are both reported from the S-node 100 (FIG. 2) to node A 10 via signal line 180.

Although FIG. 2 indicates that signal line 180 is a dedicated signal line, the present invention is also applicable to a case where this line is provided as a single LAN line or other physical line that doubles as a data exchange line. In the first preferred embodiment, the weight information is calculated by a data transmission node, that is, a node for receiving reception wait time information. However, this calculation can alternatively be performed by a data reception node, that is, a node for transmitting reception wait time information. In such an alternative embodiment, each reception node has a weight information table storing its own weight information.

Adder 1300 calculates the sum of the value reported by integrator 1250 and the value contained in integrating register 1350 and reports it to integrating register 1350. Integrating register 1350 updates the value when it detects that new wait time information is written by reception wait time register 1200 via signal line 1510. More specifically, integrating register 1350 calculates the sum of the value previously registered in integrating register 1350 and the new value delivered to adder 1300 from reception wait time register 1200 via integrator 1250, and sets the calculated sum as the value of integrating register 1350.

The values entering the registers will now be summarized. Reception wait time register 1200 records the amount of the receiving node's wait time concerning a communication via the associated port (the communication effected with transmission buffer 520). Integrating register 1350 records the total accumulated value of weighted waiting time concerning multiple communications. This total accumulated value of wait time is reset by an interval signal (e.g., a signal generated at 1-minute intervals) that is conveyed by the timer 1340 via signal line 1500. The total accumulated value is reset to ensure that the cumulative wait time data according to the latest job scheduling results is reflected in integrating register 1350.

The same operation is performed for the other ports as well. Integrating register 1350 deals with port X and records the total accumulated wait time concerning the data transmission from transmission buffer 520. Integrating register 1360 deals with port Y and records the total accumulated wait time concerning the data transmission from transmission buffer 530. Integrating register 1370 deals with port Z and records the total accumulated wait time concerning the data transmission from transmission buffer 540. Integrating register 1380 deals with port U and records the total accumulated wait time concerning the data transmission from transmission buffer 550. The reset signal for the timer 1340 is used as the trigger for simultaneously resetting all integrating registers 1350, 1360, 1370 and 1380 via signal line 1500.

The cumulative wait time recordings in integrating registers 1350, 1360, 1370 and 1380 are used by adders 1450 and 1470 via switches 1400, 1410, 1420 and 1430 to calculate the total value about each job. The value calculated by adder 1450 is recorded in register P 1460. The value calculated by adder 1470 is recorded in register Q 1480.

To indicate the correlation between the cumulative wait time and job and designate a destination register, switches 1400, 1410, 1420 and 1430 determine whether the data is to be output to adder 1450 or adder 1470. This determination is made in accordance with the information conveyed from the node group information table 570 (FIG. 2) via signal lines 1600, 1610, 1620 and 1630.

The example in FIG. 9 shows the contents of the node group information table. As is the case with the weight information table 560, the port IDs X through U represent transmission buffers 520, 530, 540 and 550, respectively. For example, the cumulative wait time data recorded in integrating register 1350 is 1 for job P or 0 for job Q in accordance with port X information, and this information is conveyed to switch 1400 via signal line 1600. Switch 1400 outputs the value of integrating register 1350 to adder 1450. As a result, the value is added to register P 1460.

The aggregate sum is stored by two registers (register P 1460 and register Q 1480) because node A 10 simultaneously executes two jobs (job P and job Q) in the first preferred embodiment. It is necessary to furnish adders and registers in accordance with the number of jobs to be executed simultaneously.

The values recorded in registers P 1460 and Q 1480 in the above process represent the cumulative aggregate sum of wait time of each node. More specifically, the cumulative aggregate sum recorded in register P 1460 indicates the wait time concerning job P, whereas the cumulative aggregate sum recorded in register Q 1480 indicates the wait time concerning job Q.

CPU 500 of node A 10 can read the contents of registers P and Q via signal lines 1650 and 1660 (FIG. 7). Since the registers are reset by the timer 1340, CPU 500 must simultaneously read the contents of registers P 1460 and Q 1480.

Next, the operation that CPU 500 performs to read the information from registers P 1460 and Q 1480 and use it for job scheduling is described.

First, CPU 500 reads the values of registers P 1460 and Q 1480 with the timing for a job scheduling change (e.g., at 30-second intervals). If, for instance, the values of registers P 1460 and Q 1480 are 10 and 20, respectively, it means that the progress of job Q execution more seriously affects the period of time the other nodes must wait than the progress of job P execution. In such a situation, the overall system efficiency can be increased by giving job Q a higher priority than job P.

Next, the method of job priority control is described.

Job priority control is provided by determining the initial time allocation for each job. If, for instance, the initial time allocation is 3 seconds for job P and 2 seconds for job Q, job P is executed for 3 seconds, and when the remaining time for job P is zero, job Q is executed for 2 seconds, and then job P is executed again for 3 seconds.

In the first preferred embodiment, the initial time allocation for each job is determined from equations 1 and 2, which are indicated below.

Job P's new initial time allocation=job P's current initial time allocation+T$d$×(register P value/ average register value−1)    Equation 1:

Job Q's new initial time allocation=job Q's current
  initial time allocation+Td×(register Q value/
  average register value−1)                    Equation 2:

In equations 1 and 2, the register P value is the value read from register P 1460, the register Q value is the value read from register Q 1480, and the average register value is the average value of register P and register Q values.

The value Td is a parameter for determining a time variable and must be smaller than the associated initial time allocation. If, for instance, the initial time allocation is 3 seconds for job P and 2 seconds for job Q, that is, the initial time allocation for each job is on the order of several seconds, the value Td must be smaller than 1 second or, more specifically, within the range of about 0.2 to 0.5 second. The above equations indicate that the priority of job P can be raised by increasing the job P's current initial time allocation so as to permit an incremental change of not greater than Td and by decreasing the job Q's current initial time allocation by the same amount.

When three jobs (P, Q, and R) need to be handled (and register R is furnished and its value can be read), the following equations can be used.

Job P's new initial time allocation=job Q's current
  initial time allocation+Td×(register Q value/
  average register value−1)                    Equation 3:

Job Q's new initial time allocation=job Q's current
  initial time allocation+Td×(register Q value/
  average register value−1)                    Equation 4:

Job R's new initial time allocation=job Q's current
  initial time allocation+Td×(register Q value/
  average register value−1)                    Equation 5:

The average register value including job R means the average value of register P value, register Q value, and register R value. If the number of registers is further increased, their average value is used in the same manner.

Next, a job management operating system (OS) operation during a job switching process, which is performed after the initial time allocations for the jobs are determined from equations 1 and 2 or equations 3 through 5, is described.

Figure 10:
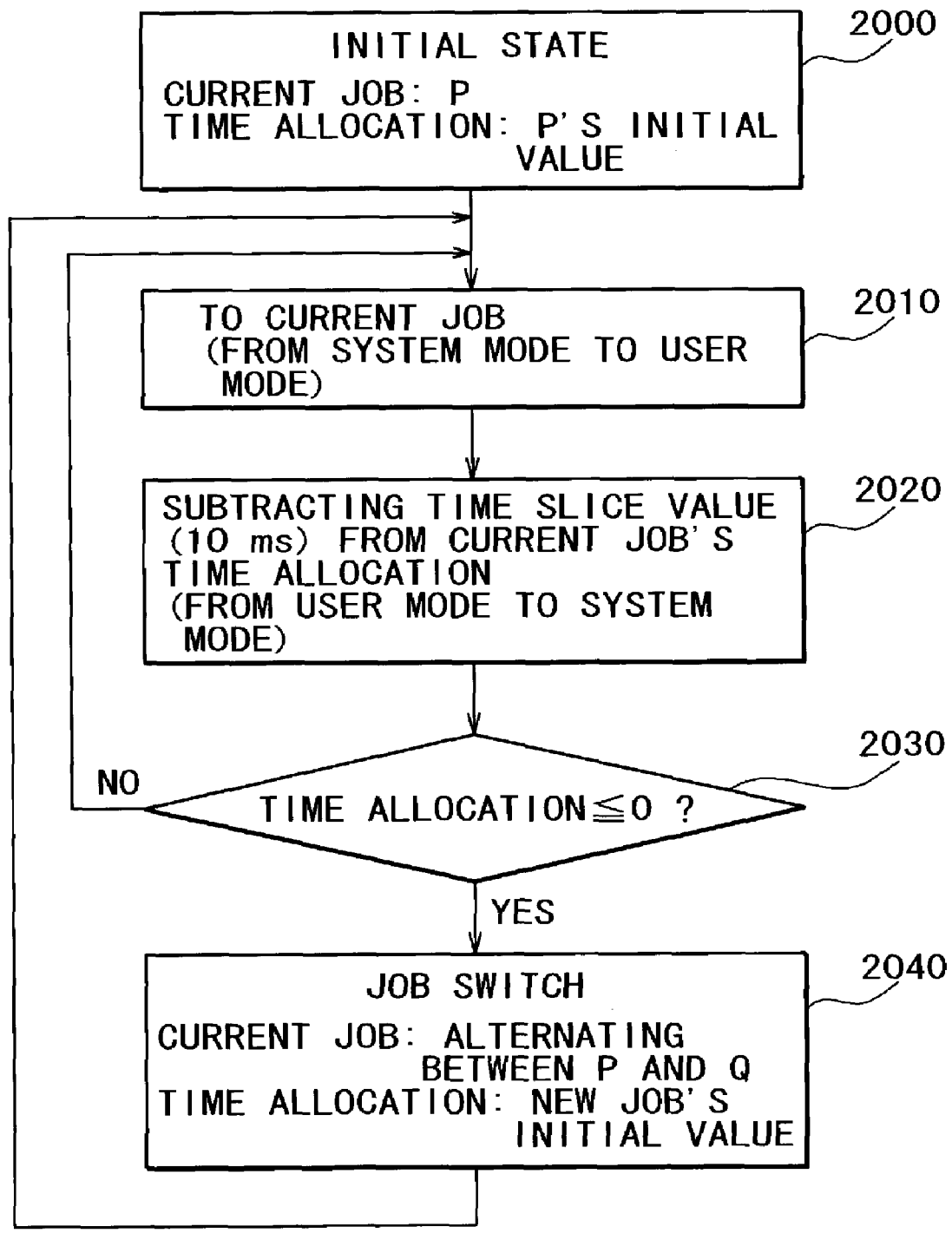
FIG. 10 is a flowchart illustrating a job switching process of an OS according to the first preferred embodiment.

FIG. 10 is a flowchart illustrating the process of a job switching OS. This process is performed for job scheduling purposes. More specifically, the system executes job P for a period equivalent to the job P's wait time, switches jobs, then executes job Q for a period equivalent to the job Q's wait time, and repeats this processing sequence.

First of all, initial status setup is performed by setting the current job to "job P" and the wait time to "P's initial value" (processing step 2000).

Next, the mode changes from the system mode to the user mode, and the process switches from the OS to the current job to start job execution (processing step 2010).

The process then enters the system mode, switches to the OS, and subtracts the time slice interrupt value (generally variable in 10 msec increments) from the P's initial value (wait time) (processing step 2020).

Next, the wait time value resulting from the subtraction is checked (processing step 2030). When the wait time value is greater than 0, the system executes the current job and further subtracts the time slice value from the wait time value (processing step 2020). The system repeats this operation until the wait time value is 0 or smaller. When the wait time value is 0 or smaller, the system proceeds to perform processing step 2040 and switches jobs.

In processing step 2040, the systems switches from job P to Q or vice versa, proceeds to perform processing step 2010, and processes the new job.

Jobs are switched by performing the above operation.

For job scheduling optimization purposes, a computing system of the first preferred embodiment performs the above-mentioned series of processes to measure the period of time during which a receiving node waits for a data transmission from a transmitting node, calculate the cumulative wait time concerning each job, and execute jobs while switching them in accordance with the calculated cumulative wait time data.

A parallel or grid computing system of the first preferred embodiment of the present invention, which is configured as described above, comprises a plurality of nodes for transmitting and receiving data and a communication path for exchanging data among the nodes. The nodes are either a transmitting node for transmitting data or a receiving node for processing a job dependent on transmitted data. The receiving node measures the time interval between the instant at which data is called for by a job and the instant at which the data is transmitted from the transmitting node to the receiving node. The wait time data measured at various nodes are added up on an individual job basis. The priority of jobs is then determined in accordance with the added wait time data to schedule the jobs. Therefore, the present invention can achieve scheduling optimization by providing dynamic job scheduling even when multi-node calculations are to be conducted while the scheduled termination time is unknown. Further, each transmitting node autonomously performs job scheduling, eliminating the necessity for centralized control over the system's job executions. Since process conflicts resulting from centralized control are avoided in this manner, job scheduling optimization can be achieved in a scalable manner with regard to the number of nodes.

Next, a computing system of a second preferred embodiment of the present invention is described below with reference to drawings.

In the first preferred embodiment, each node returns reception wait information to a transmitting node whenever it receives data. However, job scheduling is conducted for the transmitting end, for instance, at intervals of 30 seconds. Therefore, if reception wait information is returned upon each data reception, the load on a receiving node increases and the network becomes loaded with an extra amount of information.

In a computing system of the second preferred embodiment, wait time is accumulated for a predetermined period of time, calculated at a receiving node, and used for job scheduling purposes. For structures performing the same operations as in the first preferred embodiment, the same processes are performed, and their detailed descriptions are excluded from the subsequent description of the second preferred embodiment.

Figure 11:
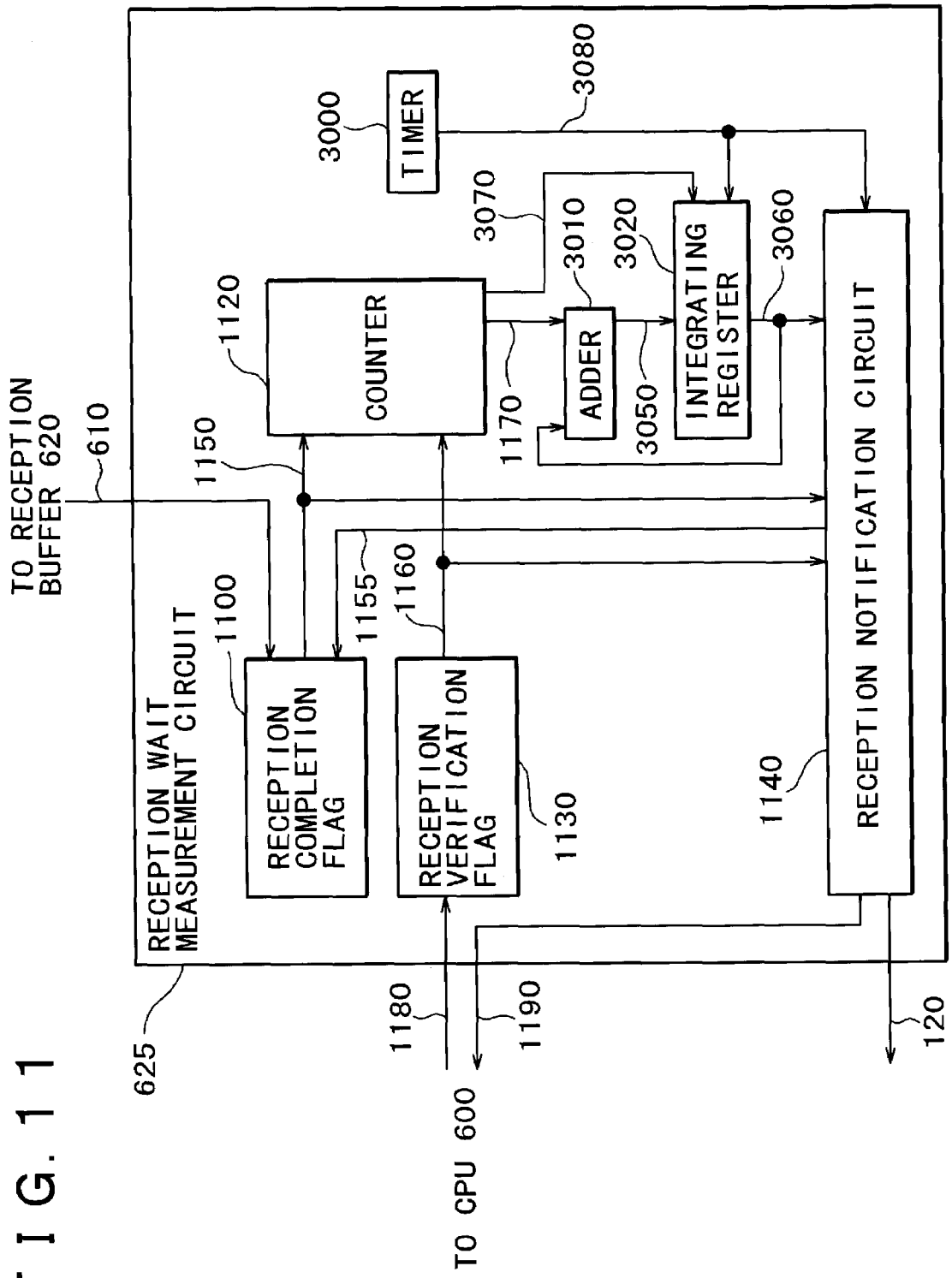
FIG. 11 is a block diagram illustrating the structure of a reception wait measurement circuit 625 of a second preferred embodiment.

FIG. 11 is a block diagram illustrating the structure of a reception wait measurement circuit 625 of the second preferred embodiment.

The reception wait measurement circuit 625 of the second preferred embodiment has the same basic structure as the reception wait measurement circuit 625 of the first preferred embodiment shown in FIG. 4. However, they differ in that the former has a timer 3000, an adder 3010, and an integrating register 3020, keeps an accumulated value of the output of an counter 1120 in integrating register 3020, and returns the resulting cumulative value to transmitting node A 10 upon receipt of an interval signal generated by the timer 3000. In the second preferred embodiment, the timer 3000 generates an interval signal at 10-second intervals.

The operation of the reception wait measurement circuit 625 of the second preferred embodiment is described below.

In the first preferred embodiment, the wait time information is returned to node A 10 when CPU 600 sets the reception verification flag 1130 to "0", that is, when the CPU has completed processes other than those dealing with received data and simply waits for the arrival of received data. In the second preferred embodiment, on the other hand, the synchronization signal (interval signal) generated at fixed intervals from timer 3000 acts as the trigger for returning the wait time information, as described below.

Further, when counter 1120 detects via signal lines 1150 and 1160 that counting is terminated, that is, the reception verification flag 1130 is set to "1" with the reception completion flag 1100 changed from "0" to "1", counter 1120 outputs the counted wait time information to adder 3010 via signal line 1170 and outputs a trigger signal to integrating register 3020 via signal line 3070. Upon receipt of the trigger signal, integrating register 3020 updates its value. More specifically, adder 3010 adds the current value of integrating register 3020 to the output of counter 1120, and then the resulting value is used as the value of integrating register 3020.

The reception notification circuit 1140 transmits the wait time information accumulated in integrating register 3020, that is, the cumulative wait time information, to transmitting node A 10 via signal line 120, using an interval signal fed from timer 3000 via signal line 3080 as a trigger. At the same time, this trigger resets integrating register 3020.

In consideration of the fact that the interval of timer 3000 varies with the node, the cumulative wait time information to be sent to node A 10 is determined by dividing the value of integrating register 3020 by the interval value of timer 3000, that is, the percentage of reception wait time to the elapsed time.

First, the operation of a load balance calculation circuit 580 of the second preferred embodiment is described.

Figure 12:
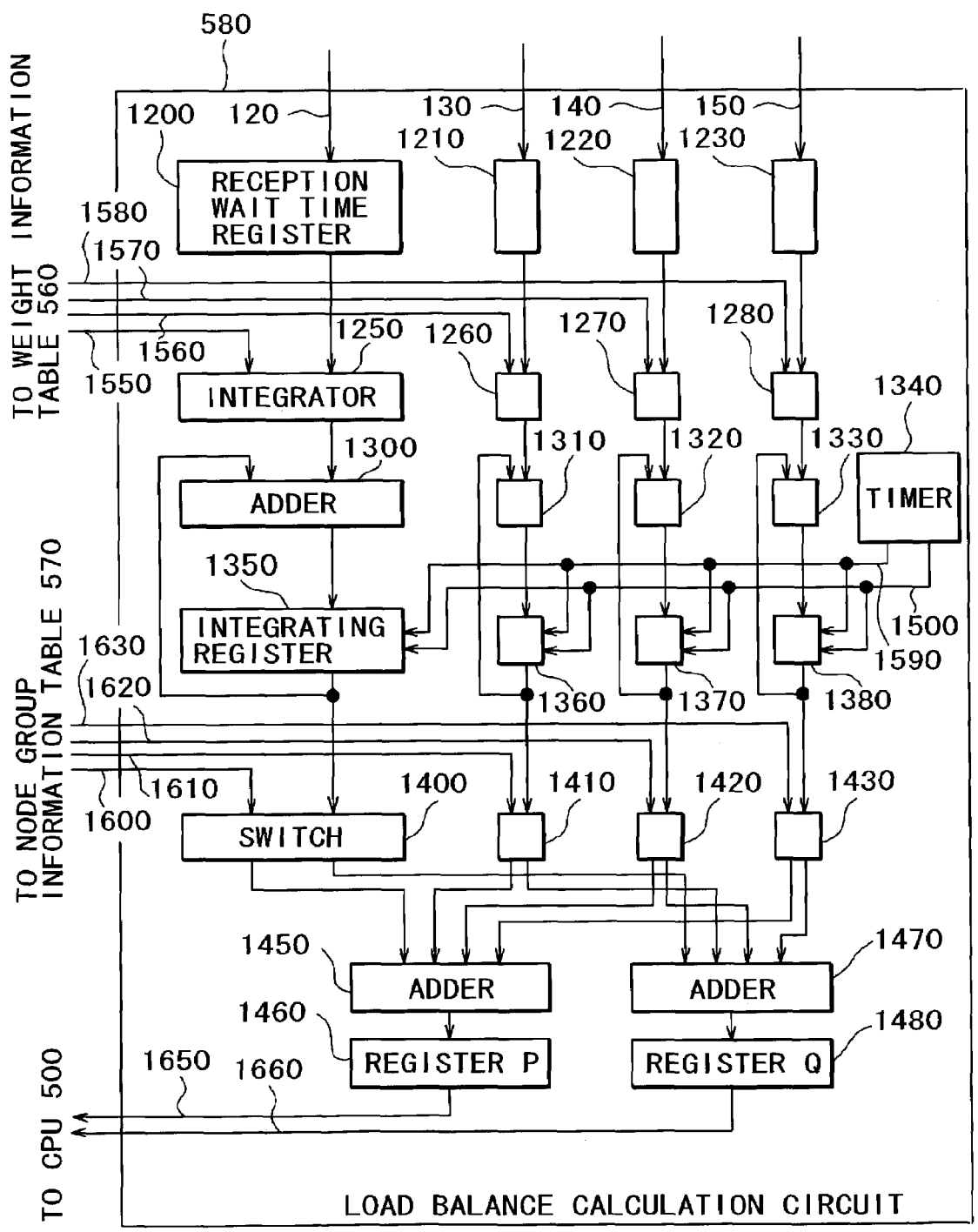
FIG. 12 is a block diagram illustrating the structure of a load balance calculation circuit 580 of the second preferred embodiment.

FIG. 12 is a block diagram illustrating the structure of the load balance calculation circuit 580 of the second preferred embodiment.

The load balance calculation circuit 580 of the second preferred embodiment has basically the same structure as the load balance calculation circuit 580 of the first preferred embodiment shown in FIG. 7. However, they differ in the reset signal operation of timer 1340. More specifically, the load balance calculation circuit 580, which handles the wait time information fed from the reception wait measurement circuit 625, can operate in principle even if it is performed in exactly the same manner as for the first preferred embodiment. However, if the wait time information is merely fed at 10-second intervals, as explained earlier with reference to an example of the reception wait measurement circuit 625 (FIG. 4) of the first preferred embodiment, some nodes may be read immediately after the arrival of cumulative wait time information with the other nodes read immediately before the arrival of cumulative wait time information depending on the timing with which CPU 500 reads registers P 1460 and Q 1480. This results in substantially different register values so that job scheduling cannot be properly conducted.

No problem occurs when the cumulative wait time information generated by various nodes arrives at exactly the same time. In reality, however, perfect timing control cannot generally be exercised. Therefore, the second preferred embodiment uses the following measures.

The load balance calculation circuit 580 of the second preferred embodiment updates the values of integrating registers 1350, 1360, 1370 and 1380 by using an interval signal generated by timer 1340 via signal line 1590 and not with the update timing for reception wait time registers 1200, 1210, 1220 and 1230. It is presumed that this interval signal is generated at intervals adequately shorter than those for the reset signal conveyed via signal line 1500 and the interval signal of timer 3000 (FIG. 1). If, for instance, the interval is 1 minute for signal line 1500 and 10 seconds for timer 3000, the interval for signal line 1590 should be set to 0.1 second.

At 0.1-second intervals, each of the integrating registers 1350, 1360, 1370 and 1380 adds the value weighted by integrating register 1250 to the values recorded in reception wait time registers 1200, 1210, 1220 and 1230. This ensures that integrating registers 1350, 1360, 1370 and 1380 are updated at 0.1-second intervals even when reception wait time registers 1200, 1210, 1220 and 1230 are merely updated at 10-second intervals by a node's reception wait measurement circuit. As a result, the values of registers P 1460 and Q 1480 do not greatly change at 10-second intervals. More specifically, there will be no substantial differences among register values although some nodes might otherwise be read immediately after the arrival of cumulative wait time information with the other nodes read immediately before the arrival of cumulative wait time information depending on the timing with which registers P 1460 and Q 1480 are read.

Note that the cumulative wait time data reported by the reception wait measurement circuit of each node changes only when reception wait time registers 1200, 1210, 1220 and 1230 are updated, that is, at 10-second intervals only. When compared to the first preferred embodiment, therefore, the job scheduling accuracy is lowered, but the load on the nodes and a network for inter-node communication can be reduced because the reception wait time information about all nodes is updated at 10-second intervals instead of updating the information about individual nodes upon each data reception.

A computing system of the second preferred embodiment, which is configured as described above, not only produces the effects achieved by the first preferred embodiment but also reduces the load on the nodes and a data exchange network as it calculates the cumulative wait time data concerning each node and conveys the calculated cumulative wait time data to a transmitting node whenever the timer provided for a receiving node generates an interval signal.

Next, a computing system of a third preferred embodiment of the present invention is described below with reference to drawings.

Computing systems of the first and second preferred embodiments use hardware operations to achieve inter-node data exchange and job scheduling optimization. A computing system of the third preferred embodiment uses software to achieve such a purpose. For structures performing the same operations as in the first and second preferred embodiments, their detailed descriptions are excluded from the subsequent description of the third preferred embodiment.

First, the data transmission operation of a preferred transmitting node is described.

Figure 13:
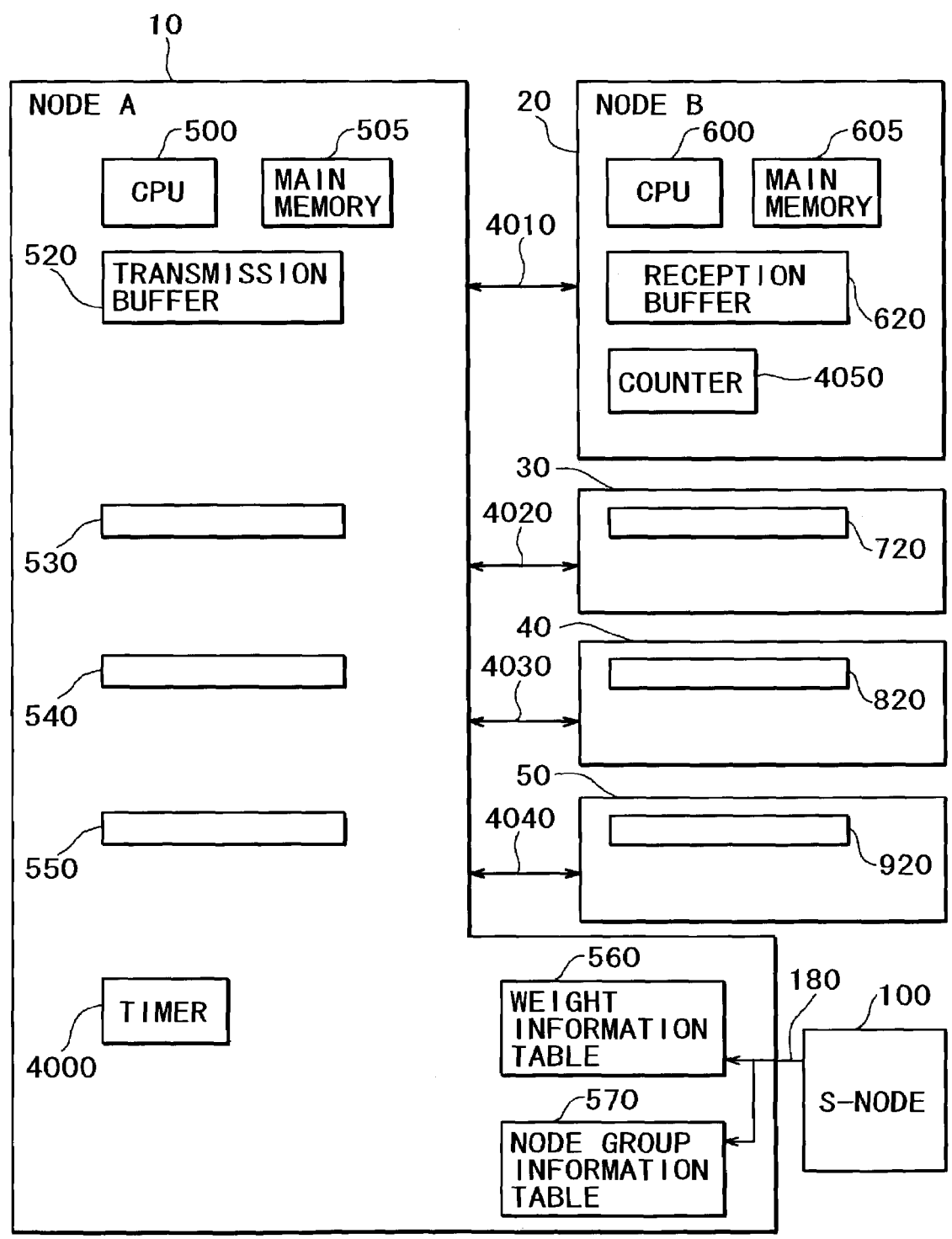
FIG. 13 is a block diagram illustrating a computing system of a third preferred embodiment.

FIG. 13 is a block diagram illustrating a computing system of the third preferred embodiment.

Node A 10 is a node for transmitting data. Nodes B 20, C 30, D 40, and E 50 are nodes for receiving data. Nodes B 20, C 30, D 40, and E 50 have the same internal structure.

Transmission buffer 520 correlates to reception buffer 620 of node B 20. Transmission buffer 530 correlates to reception buffer 720 of node C 30. Transmission buffer 540 correlates to reception buffer 820 of node D 40. Transmission buffer 550 correlates to reception buffer 920 of node E 50.

Figure 14:
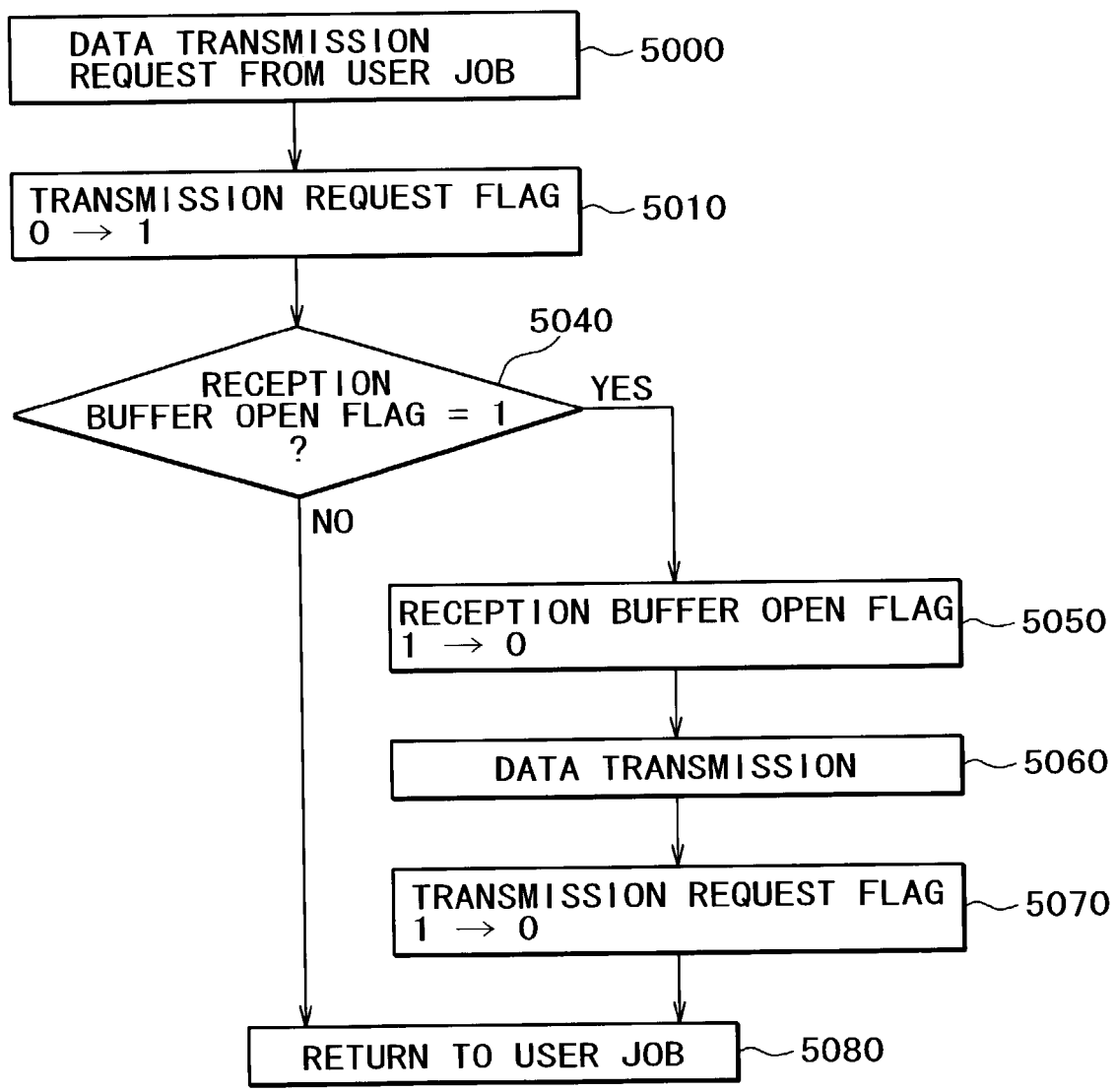
FIG. 14 is a flowchart illustrating a data transmission from a transmitting node to a receiving node according to the third preferred embodiment.

FIG. 14 is a flowchart illustrating a data transmission from a transmitting node to a receiving node. The description below deals with a data transmission from node A 10 to node B 20.

When a user job requires a data transmission to receiving node B 20, it first waits until the transmission request flag in a main memory 505 (FIG. 13) of transmitting node A 10 is "0" or set to "0", writes data in transmission buffer 520, issues a system call to switch from the user mode to the system mode, and passes processing to the OS. This causes the OS to perform a transmission request process (processing step 5000).

First, the OS changes the transmission request flag from "0" to "1" (processing step 5010). The transmission request flag exists in the main memory 505, has an initial value of "0", and is managed by the OS. When the flag is "0", it means that transmission buffer 520 is available. When the flag is "1", it means that untransmitted data is left in transmission buffer 520.

Next, the OS checks whether the reception buffer open flag is "1" (processing step 5040). This check is conducted to determine whether reception buffer 620 of receiving node B 20 is available. The reception buffer open flag exists in the main memory 505, has an initial value of "1", and is managed by the OS. When the flag is "1", it means that reception buffer 620 of the receiving node is available. When the flag is "0", it means that some transmitted data is left in reception buffer 620 of the receiving node to be read by the user job at the receiving node.

When the reception buffer open flag is "1", it means that data can be transmitted immediately. Therefore, the reception buffer open flag is set to "0" (processing step 5050) and then the data is transmitted to reception buffer 620 via signal line 4010 (processing step 5060). When the data is transmitted to reception buffer 620, transmission buffer 520 is opened and rendered available. Therefore, the transmission request flag is reset from "1" to "0" (processing step 5070), and then the OS returns processing to the user job (processing step 5080).

If the reception buffer open flag is "0" in processing step 5040, data cannot be transmitted until receiving node B 20 notifies that reception buffer 620 is opened. Therefore, the system first enters the user mode and then executes the user job (processing step 5080).

Next, the operation of receiving node B 20 is described.

Figure 15:
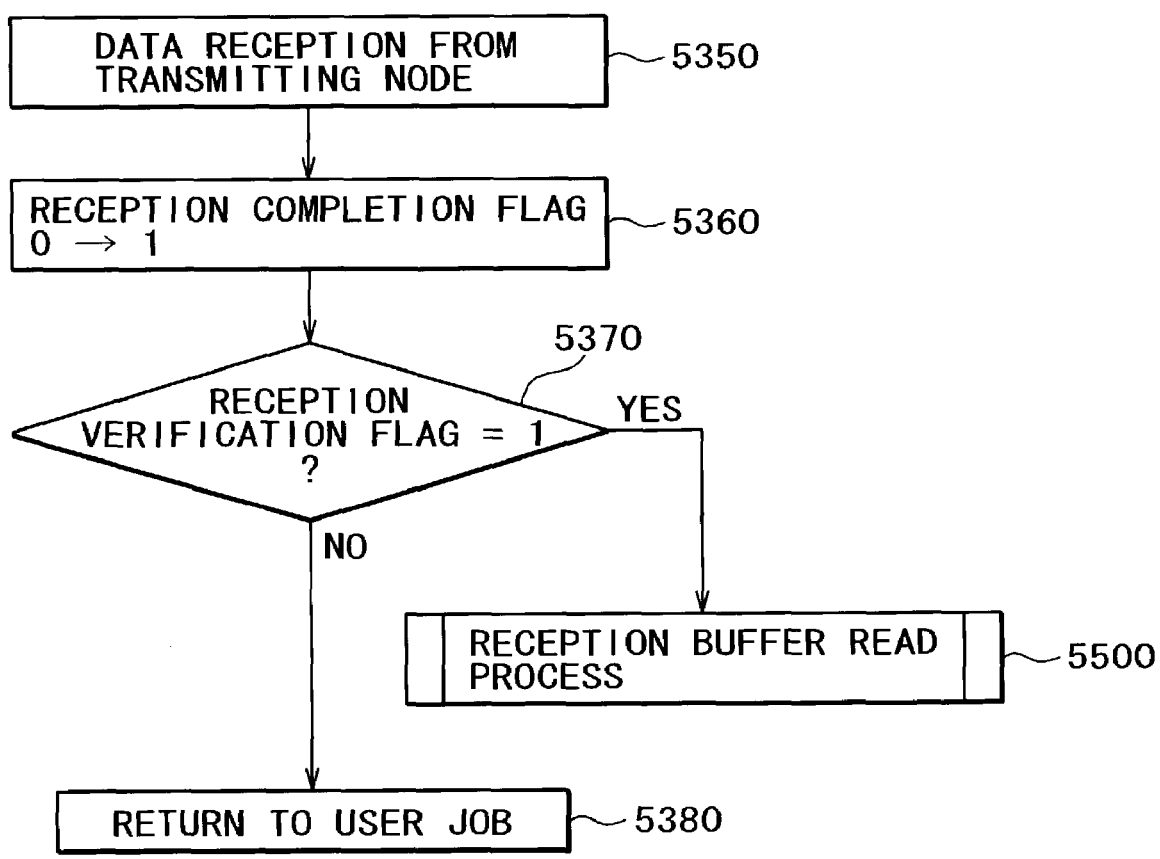
FIG. 15 is a flowchart illustrating a process that is performed when data is transmitted from a transmitting node according to the third preferred embodiment.

First, the process to be performed upon a data transmission from transmitting node A 10 (FIG. 15) is described.

When data is transmitted from transmitting node A 10, CPU 600 (FIG. 13) is notified of an interrupt. When notified of such an interrupt, CPU 600 switches from the user mode to the system mode and passes processing to the OS to receive the data (processing step 5350).

Upon completion of the reception, the OS changes the reception completion flag from "0" to "1" (processing step 5360). The reception completion flag exists in the main memory 605, has an initial value of "0", and is managed by the OS. When the flag is "0", it means that the reception buffer is open. When the flag is "1", on the other hand, it means that some data is left in the reception buffer to be read although the reception is completed.

Next, the reception verification flag is checked (processing step 5370). The reception verification flag exists in the main memory 605, has an initial value of "0", and is managed by the OS. When the flag is "1", it means that data is not received yet although the user job at receiving node B 20 is ready to receive data. When the flag is "0", it means that data cannot be received because the process on the user job side is not completed. In this instance, the system switches from the system mode to the user mode and passes processing to the user job (processing step 5380).

When the reception verification flag is "1", the system proceeds to a reception buffer read process 5500.

Next, the process to be performed for issuing a data reception request to transmitting node A 10 when the user job at receiving node B 20 is ready for data reception (FIG. 16) is described.

When the user job is ready for data reception, it issues a system call to switch from the user mode to the system mode and passes processing to the OS. The OS starts a process for data reception (processing step 5300).

Next, the OS changes the reception verification flag to "1" (processing step 5310).

Next, counter 4050 (FIG. 13) is started up to begin counting (processing step 5320). This counter 4050 counts the time interval between the instant at which the preparations for data reception are made and the instant at which a data transmission begins.

Next, the reception completion flag is checked (processing step 5330). If received data has not arrived yet (the reception completion flag is "0"), the system switches from the system mode to the user mode and passes processing to the user job (processing step 5340). Even when processing is returned in this instance to a user job that requires a data transmission from a transmitting node, the system frequently has to wait for a data reception in reality and has no process to perform. Therefore, if there is another job entailing no communication, the efficiency can be increased by switching to such a job.

If received data has already arrived (the reception completion flag is "1"), a reception buffer read process 5500 is performed.

Figure 17:
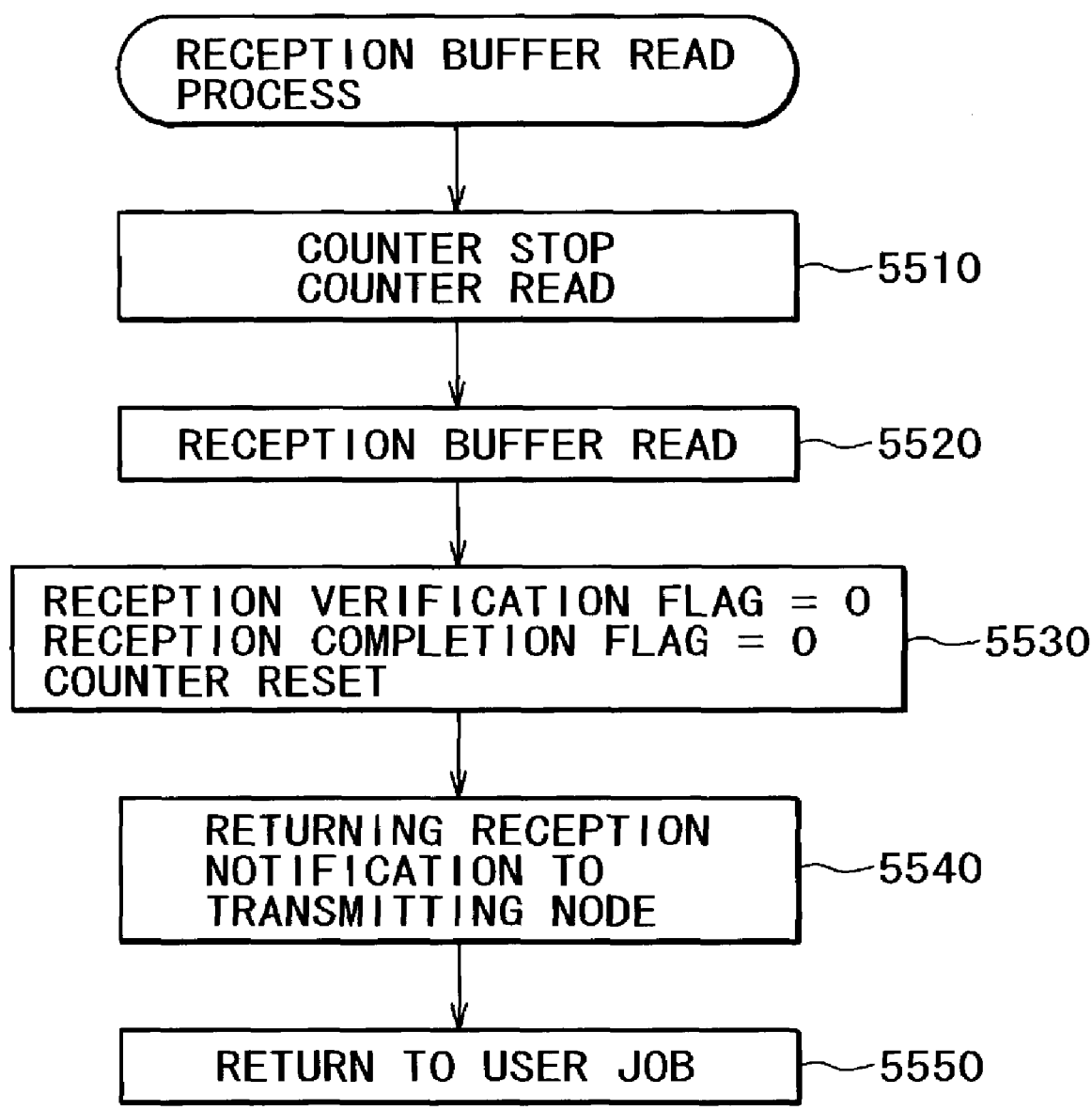
FIG. 17 is a flowchart illustrating a process that is performed to read a reception buffer according to the third preferred embodiment.

Next, the reception buffer read process (FIG. 17) is described.

This process is performed to read data from a reception buffer when necessary received data exists in reception buffer 620 and the user job is ready for data reception. More specifically, this process is performed if the reception verification flag is found to be "1" when transmitted data is completely received (processing step 5370 in FIG. 15) or if the reception completion flag is found to be "1" when a data reception request is received from a user job (processing step 5330 in FIG. 16).

First, the counting operation of counter 4050 is stopped, and then the reached count is read (processing step 5510).

The read counter value indicates the interval between the instant at which the user job is ready for data reception and the instant at which the data reception starts. If the data transmitted from transmitting node A 10 arrives before the user job is ready for data reception, the counter counts the time interval between processing steps 5320 and 5510 in FIG. 15; therefore, the resulting count is an extremely small value (that is, the wait time is virtually zero). However, if the data transmitted from transmitting node A 10 arrives after the user job is ready for data reception (FIG. 16), such a data arrival occurs while another job is being executed subsequently to a branch that is performed in the direction of NO in processing step 5330 after processing step 5320 for counter startup in FIG. 16. When this data arrives in this manner, the system proceeds to perform processing step 5350 in FIG. 15. Subsequently, a branch is performed in the direction of YES in processing step 5370 because the reception verification flag is "1", and the counter is stopped in processing step 5510. Therefore, the counter counts the time interval between the instant at which the user job is ready for data reception and the instant at which the data reception starts.

Next, the reception buffer is read, and the read data is passed to the user job (processing step 5520).

Since the reception buffer becomes available after its data is read, the reception completion flag is set to "0". Further, since the user job's wait for reception ends, the reception verification flag is set to "0". At the same time, the counter resets (processing step 5530).

The reception process is now completed. Therefore, transmitting node A 10 is notified via signal line 4010 that the reception buffer is opened. At the same time, the information about the wait time counted by the counter is also conveyed to transmitting node A 10 (processing step 5540).

Finally, the system switches from the system mode to the user mode and passes processing to the user job (processing step 5550).

Figure 18:
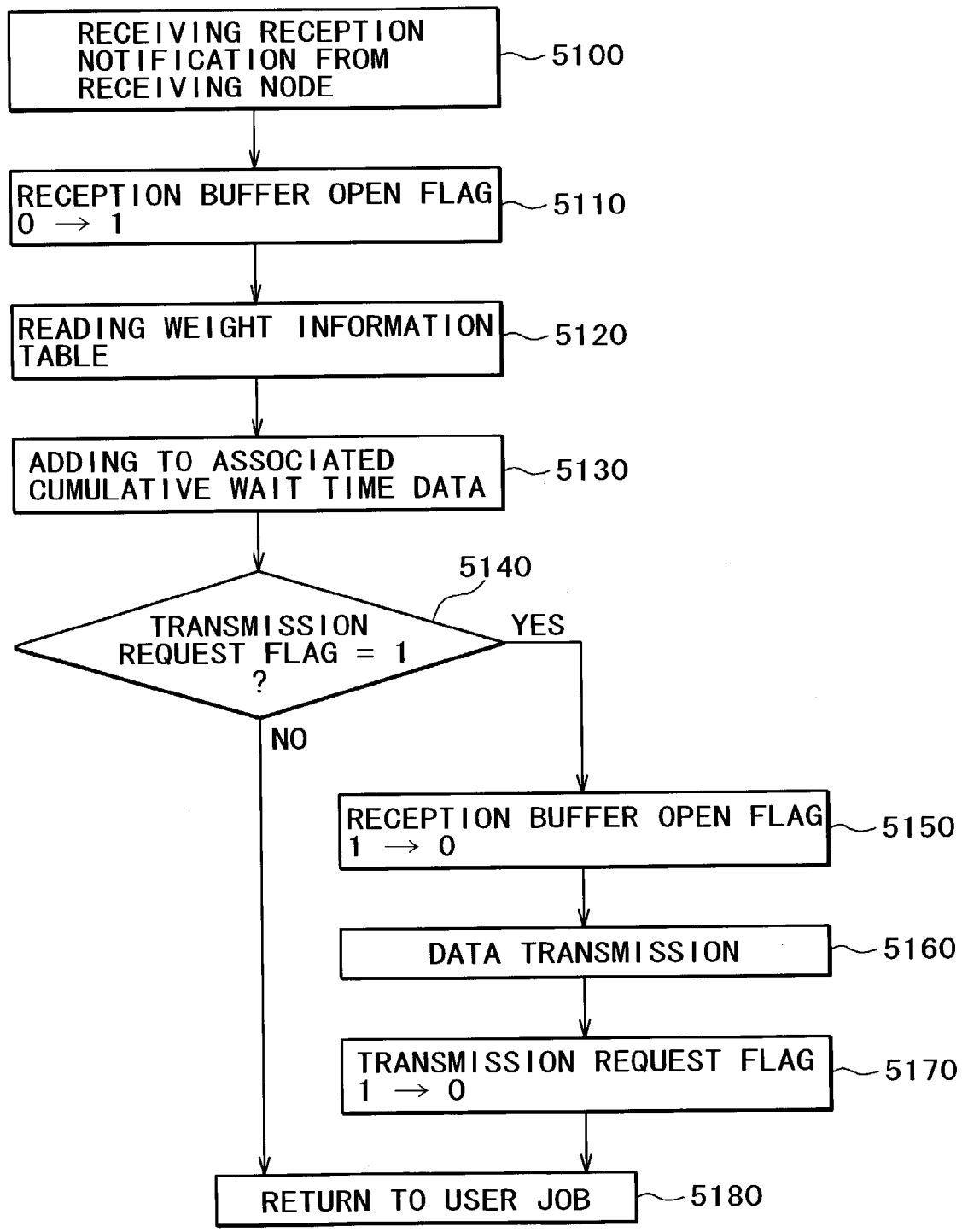
FIG. 18 is a flowchart illustrating a process that is performed when a transmitting node receives a reception completion notification from a receiving node according to the third preferred embodiment.

Next, the process to be performed when transmitting node A 10 receives a reception completion notification from, receiving node B 20 (FIG. 18) is described.

When a reception completion notification is received, the system switches from the user mode to the system mode and passes processing from the user job to the OS (processing step 5100).

Since the reception completion notification indicates an open reception buffer, the reception buffer open flag is set to "1" (processing step 5110).

For storage of the wait time information transmitted together with the reception completion notification, the weight information table 560 is read to grasp the associated receiving node weight (processing step 5120).

Next, the product of the transmitted wait time information and the weight grasped in processing step 5120 is calculated. The resulting value is added to the cumulative wait time data about the associated transmission buffer. The resulting sum is used as the new cumulative-wait time data (processing step 5130). The cumulative wait time data exists in the main memory 505, has an initial value of "0", and is managed by the OS. This cumulative wait time data is used for job switching, described below.

Next, the transmission request flag is checked (processing step 5140). If the transmission request flag is "0", it means that transmission buffer 520 does not have the data to send next although reception buffer 620 of receiving node B 20 is open. Therefore, processing returns to the user job (processing step 5180). If the transmission request flag is "1", on the other hand, data is transmitted to reception buffer 620 of receiving node B 20. After transmission buffer 520 of transmitting node A 10 becomes available and before the user job at receiving node B 20 issues a data reception request to read data from reception buffer 620, making reception buffer 620 available, the user job at transmitting node A 10 issues the next data transmission request, indicating that transmission data is ready again in transmission buffer 520. As a result, data can be transmitted immediately.

Therefore, the reception buffer open flag is set to "0" (processing step 5150), and then the data is transmitted to reception buffer 620 via signal line 4010 (processing step 5160). When the data is transmitted to reception buffer 620, transmission buffer is opened and rendered available. Therefore, the transmission request flag is reset from "1" to "0" (processing step 5170), and then processing returns from the OS to the user job (processing step 5180).

If the reception buffer open flag is "0" in processing step 5140, the data transmission cannot be started until receiving node B 20 notifies that reception buffer 620 is opened. Therefore, the system switches to the user mode and executes a user job process (processing step 5180).

Thanks to the above process, the OS can perform a flag operation to transmit data from a transmitting node to a receiving node with a transmission buffer and reception buffer.

Figure 19:
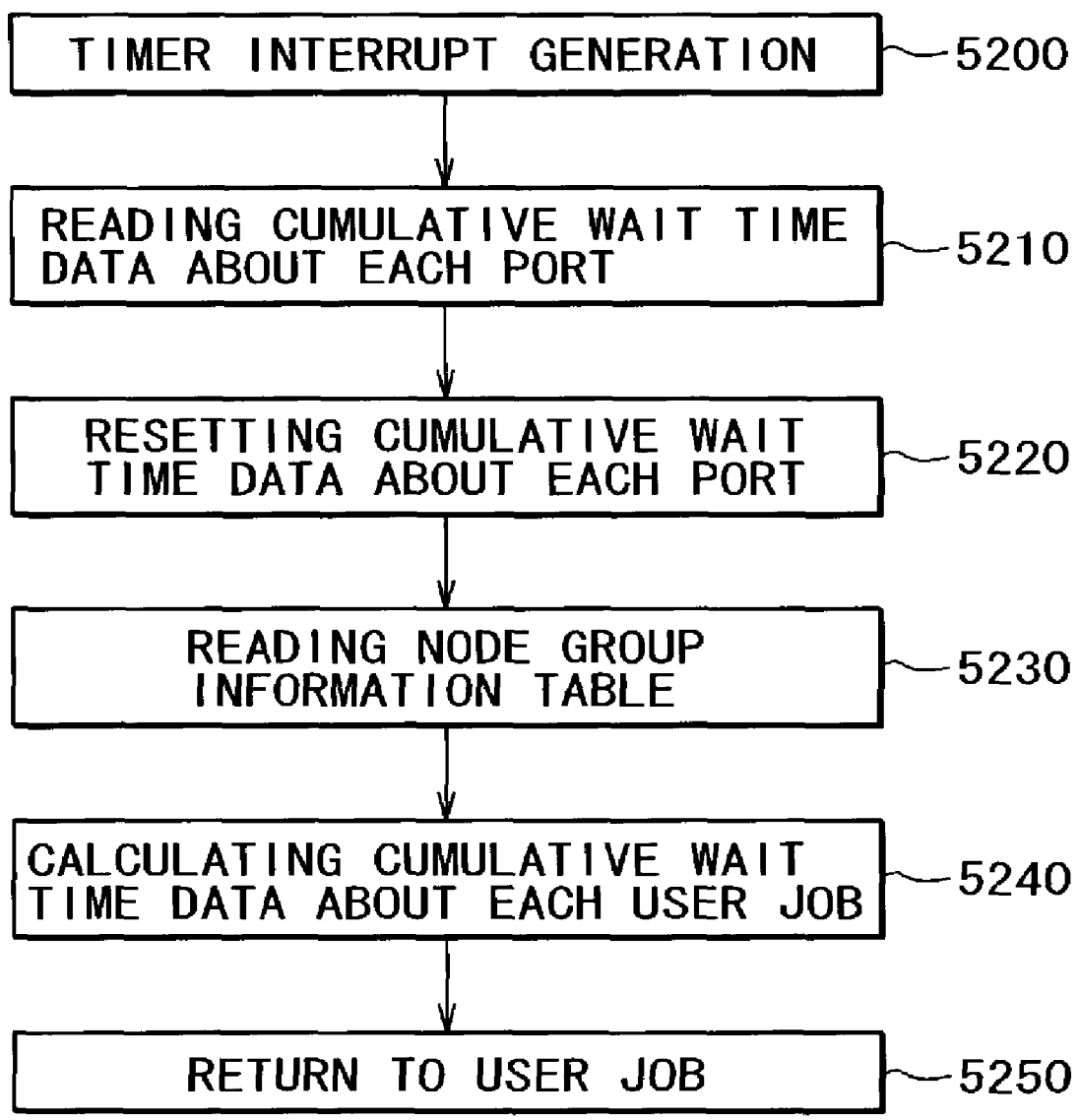
FIG. 19 is a flowchart illustrating a process that is performed to switch user jobs with cumulative wait time data calculated and recorded by transmitting node A according to the third preferred embodiment.

Next, the process for switching user jobs in accordance with the cumulative wait time data calculated and recorded in transmitting node A 10 (FIG. 19) is described.

The job switching process starts when timer 4000 (FIG. 13) issues an interrupt to CPU 500 (processing step 5200).

When the job switch process starts, the OS reads the cumulative wait time data about each port (processing step 5210), and then resets the cumulative wait time data about each port (processing step 5220).

For calculating the job switch setting from the read cumulative wait time data, the node group information table 570 (FIG. 13) is first read (processing step 5230) The node group information table 570 is used to determine what ports belong to what user jobs. The cumulative wait time data about the ports are added to determine the total cumulative wait time data about each job (processing step 5240). In the third preferred embodiment, it is presumed that the ports belong to either job P or job Q as is the case with the first preferred embodiment.

The total cumulative wait time data mentioned above is used for job priority as is the case with the first preferred embodiment. Therefore, the initial job switch value for jobs P and Q is calculated and then processed in relation to each time slice, as indicated in FIG. 10 and in the same manner as described for the first preferred embodiment, to switch user jobs at a proper ratio.

Finally, the system switches from the system mode to the user mode and passes processing to the user job (processing step 5250).

The third preferred embodiment, which is configured as described above produces the same effects as achieved by the first and second preferred embodiments. More specifically, the third preferred embodiment is capable of operating the OS (software) so as to transmit data from a transmitting node to a receiving node, calculate the cumulative wait time data about each node, and switch user jobs in accordance with the calculated wait time information for job scheduling optimization purposes.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A computing system comprising:
   a plurality of nodes for transmitting and receiving data and a communication path for exchanging data among said nodes, each of said nodes being either a transmitting node for transmitting data or a receiving node for processing a job dependent on transmitted data;
   time measuring means for measuring the time interval between the instant at which data is called for by said job and the instant at which the data is transmitted from said transmitting node to said receiving node;
   time counting means for adding up said measured time data on an individual job basis;
   job scheduling means for scheduling jobs determining in accordance with the counted time,
   wherein the time measuring means comprises a counter that starts counting in response to said job calling for data and stopping counting in response to the transmitted data reaching a reception buffer in a receiving node, and
   wherein said transmitting node comprises load balance measuring means for adding up said time data measured at various nodes on an individual job basis, and said scheduling means determines the priority of jobs in accordance with the time count of each job and schedules the jobs, and the load balance measuring means comprises a load balance calculation circuit that adds waiting time at each node measured by the counter.

2. The computing system according to claim 1, wherein said time measuring means calculates the cumulative time per unit time at a node receiving said time data and notifies said load balance measuring means of the calculated cumulative time per said unit time.

3. The computing system according to claim 2, wherein said load balance measuring means is notified of said calculated cumulative time per said unit time in synchronism with signals generated at fixed intervals by said wait time measuring means.

4. The computing system according to claim 2, wherein said load balance measuring means retains weight information according to the load on job processes performed at nodes, calculates the product of said wait time data and weight information, and determines the total accumulated value of calculated values.

5. The computing system according to claim 1 wherein said load balance measuring means retains weight information according to the load on job processes performed at nodes, calculates the product of said wait time data and weight information, and determines the total accumulated value of calculated values.

6. The computing system according to claim 1 wherein said transmitting node comprises load balance measuring means for adding up said time data measured at various nodes on an individual job basis, and said scheduling means determines the priority of jobs in accordance with the time count of each job and schedules the jobs.

7. The computing system according to claim 1 wherein said load wherein said transmitting node comprises load balance measuring means for adding up balance measuring means retains weight information according to the load on job processes performed at nodes, calculates the product of said wait time data and weight information, and determines the total accumulated value of calculated values.

* * * * *